United States Patent
Harrow

(10) Patent No.: US 11,006,761 B2
(45) Date of Patent: May 18, 2021

(54) MATTRESS FOUNDATION

(71) Applicant: Jason Harrow, Los Angeles, CA (US)

(72) Inventor: Jason Harrow, Los Angeles, CA (US)

( * ) Notice: Subject to any disclaimer, the term of this patent is extended or adjusted under 35 U.S.C. 154(b) by 0 days.

(21) Appl. No.: 16/787,364

(22) Filed: Feb. 11, 2020

(65) Prior Publication Data

US 2020/0170413 A1    Jun. 4, 2020

Related U.S. Application Data

(63) Continuation of application No. 16/545,557, filed on Aug. 20, 2019, now Pat. No. 10,595,643, which is a continuation-in-part of application No. 15/646,408, filed on Jul. 11, 2017, now Pat. No. 10,508,674, which is a continuation-in-part of application No. 15/606,126, filed on May 26, 2017, now Pat. No.
(Continued)

(51) Int. Cl.

| | |
|---|---|
| *A47C 19/00* | (2006.01) |
| *F16B 12/50* | (2006.01) |
| *F16B 12/02* | (2006.01) |
| *F16B 12/46* | (2006.01) |
| *A47C 19/02* | (2006.01) |

(52) U.S. Cl.
CPC ............ *A47C 19/005* (2013.01); *F16B 12/02* (2013.01); *F16B 12/46* (2013.01); *F16B 12/50* (2013.01); *A47C 19/00* (2013.01); *A47C 19/027* (2013.01)

(58) Field of Classification Search
CPC ..... A47C 19/005; A47C 19/00; A47C 19/027; F16B 12/02; F16B 12/46; F16B 12/50
See application file for complete search history.

(56) References Cited

U.S. PATENT DOCUMENTS

| 1,496,555 A | 6/1924 | Novitzky |
| 1,593,451 A | 7/1926 | Hein |

(Continued)

FOREIGN PATENT DOCUMENTS

| EP | 0192890 A3 | 9/1986 |
| WO | WO 2010015018 A1 | 2/2010 |

OTHER PUBLICATIONS

Printout of webpage at https://www.amazon.com/exect/obidos/ASIN/B008WO0XXK/ezvid02-20 on Aug. 12, 2016.
(Continued)

*Primary Examiner* — Robert G Santos
*Assistant Examiner* — Rahib T Zaman
(74) *Attorney, Agent, or Firm* — Joseph G Swan, PC

(57) ABSTRACT

A mattress foundation includes: a head end panel assembly; a foot end panel assembly; a left side panel assembly; and a right side panel assembly, all slidably attaching to each other using sliding mechanisms. At least one of the sliding mechanisms includes an elongated slot and an elongated protruding element that fits within the elongated slot. A horizontal cross-section of the elongated slot and/or the elongated protruding element includes thin elongated flexible arms, attached at their proximal ends to a common surface, but otherwise extending away from such common surface and separated from each other. When viewed from the horizontal cross-section, the average thickness of the thin elongated flexible arms is substantially less than the length of the thin elongated flexible arms.

15 Claims, 19 Drawing Sheets

Related U.S. Application Data 10,188,217, said application No. 16/545,557 is a continuation-in-part of application No. 15/468,291, filed on Mar. 24, 2017, now abandoned.

(60) Provisional application No. 62/448,333, filed on Jan. 19, 2017, provisional application No. 62/404,263, filed on Oct. 5, 2016.

(56) References Cited

U.S. PATENT DOCUMENTS

| | | | |
|---|---|---|---|
| 1,826,421 A | 10/1931 | Butkus | |
| 2,144,929 A | 1/1939 | Paladino | |
| 2,203,780 A | 6/1940 | Gatz | |
| 2,793,407 A | 5/1957 | Johnston | |
| 3,408,666 A | 11/1968 | Harris | |
| 3,590,753 A | 7/1971 | Blink | |
| 3,621,497 A | 11/1971 | Fitzgerald | |
| 3,644,948 A | 2/1972 | Fredman | |
| 3,670,899 A | 6/1972 | Kronenberg | |
| 3,683,429 A | 8/1972 | Mis | |
| 3,761,974 A | 10/1973 | Kuss | |
| 3,768,106 A | 10/1973 | Fitzgerald et al. | |
| 3,913,154 A | 10/1975 | Sweeney | |
| 4,019,298 A | 4/1977 | Johnson, IV | |
| 4,020,512 A | 5/1977 | Pringle | |
| 4,160,296 A | 7/1979 | Fogel | |
| 4,391,008 A * | 7/1983 | Yamaoka | A47C 19/005 5/200.1 |
| 4,429,426 A | 2/1984 | Gutner | |
| 4,617,689 A | 10/1986 | Nelson et al. | |
| 4,654,905 A | 4/1987 | Miller | |
| 4,734,946 A * | 4/1988 | Saputo | A47C 27/085 5/201 |
| 4,771,995 A | 9/1988 | Wells et al. | |
| 4,788,727 A * | 12/1988 | Liu | A47C 19/005 5/174 |
| 5,070,556 A | 12/1991 | Gloger | |
| 5,099,529 A * | 3/1992 | Anderson | A47C 19/04 5/201 |
| 5,564,140 A | 10/1996 | Shoenhair et al. | |
| 5,765,240 A | 6/1998 | Workman | |
| 5,894,614 A | 4/1999 | Stroud | |
| 6,032,307 A | 3/2000 | Workman | |
| 6,134,728 A | 10/2000 | Hernandez | |
| 7,003,822 B1 * | 2/2006 | Sheehy | A47C 19/005 5/200.1 |
| 7,376,988 B2 | 5/2008 | Wickstrom et al. | |
| 7,406,727 B2 | 8/2008 | Wickstrom et al. | |
| 7,503,086 B2 | 3/2009 | Wickstrom et al. | |
| 7,703,155 B1 * | 4/2010 | Roberts | A47C 19/005 5/400 |
| 7,900,300 B1 * | 3/2011 | Roberts | A47C 19/005 5/400 |
| 8,312,576 B1 | 11/2012 | Oh | |
| 8,370,973 B1 | 2/2013 | Oh | |
| 8,584,277 B1 * | 11/2013 | Roberts | A47C 19/005 5/400 |
| 8,850,638 B1 * | 10/2014 | Suh | A47C 19/005 5/201 |
| 9,080,304 B1 | 7/2015 | Roberts et al. | |
| 9,414,690 B2 | 8/2016 | Harrow | |
| 9,924,804 B2 * | 3/2018 | Hartley | A47C 19/005 |
| 2004/0055086 A1 | 3/2004 | Owens, Jr. et al. | |
| 2005/0039258 A1 * | 2/2005 | Gavela Vazquez | A47C 23/061 5/400 |
| 2005/0235417 A1 * | 10/2005 | Koughan | A47C 19/005 5/400 |
| 2005/0251911 A1 | 11/2005 | Wickstrom et al. | |
| 2006/0195983 A1 | 9/2006 | Polevoy et al. | |
| 2007/0044235 A1 | 3/2007 | Navarro et al. | |
| 2007/0283501 A1 | 12/2007 | Mossbeck | |
| 2008/0092289 A1 | 4/2008 | Smith et al. | |
| 2009/0025143 A1 * | 1/2009 | Oh | A47C 19/005 5/201 |
| 2010/0138994 A1 | 6/2010 | Lee et al. | |
| 2010/0175187 A1 * | 7/2010 | Hall | A47C 19/005 5/400 |
| 2014/0109313 A1 | 4/2014 | Rohr | |
| 2015/0096120 A1 | 4/2015 | Scarleski | |
| 2015/0327684 A1 | 11/2015 | Lee | |
| 2016/0157622 A1 | 6/2016 | Oh | |
| 2016/0255963 A1 * | 9/2016 | Jones | A47C 19/025 |
| 2017/0042336 A1 * | 2/2017 | Craver | A47C 23/06 |
| 2017/0208954 A1 | 7/2017 | Lee | |
| 2018/0055235 A1 | 3/2018 | Choi | |
| 2018/0140103 A1 * | 5/2018 | Thompson | A47C 19/025 |
| 2018/0332975 A1 | 11/2018 | Choi | |

OTHER PUBLICATIONS

Printout of webpage at http://www.costco.com/Sleep-Science-Queen-Folding-Mattress-Foundation.product.100004204.html on Aug. 12, 2016.

Printout of webpage at https://www.amazon.com/Master-BiFold-Folding-Mattress-Foundation/dp/B00X6HZ932 on Aug. 12, 2016.

Printout of webpage at http://www.walmart.com/ip/24628979?wmlspartner=wlpa&adid=22222222227017875282&wl0=&wl1=g&wl2=c&wl3=40845255992&wl4=pla-78658011152&wl5=9031507&wl6=&wl7=9031514&wl8=&wl9=pla&wl10=8175035&wl11=online&wl12=24628979&wl13=&veh=sem on Aug. 12, 2016.

Printout of webpage at http://www.furninfo.com/Furniture%20Industry%20News%20Archive/7054 on Aug. 12, 2016.

Printout of webpage at https://www.nestbedding.com/products/sturdy-folding-metal-foundation-box-spring?vrariant=874981525 on Aug. 12, 2016.

Prosecution history of, including the prior art cited in, parent U.S. Appl. No. 15/606,126, filed May 26, 2017 (now U.S. Pat. No. 10,188,217).

Prosecution history of, including the prior art cited in, parent U.S. Appl. No. 15/646,408, filed Jul. 11, 2017 (now U.S. Pat. No. 10,508,674).

Prosecution history of, including the prior art cited in, parent U.S. Appl. No. 15/468,291, filed Mar. 24, 2017.

Prosecution history of, including the prior art cited in, parent U.S. Appl. No. 16/545,557, filed Aug. 20, 2019.

Printout of webpage at https://www.amazon.com/Zinus-Standing-Mattress-Foundation-Structure/dp/B00VMHOLLY?ref_=fsclp_pl_dp_3 on Feb. 6, 2020.

Screenshots from video at https://d1y6jrbzotnyjg.cloudfront.net/V3MSA/814007fa8f734dbfaee6cf5fc48ed88d/V1/6593c6cbf87f4d73a903ff06f8bca818/ShortForm-Generic-480p-16-9-1409173089793-rpcbe5.mp4?Expires=1582142529&Signature=gRsx3F6uBDMP~QHIVE9psTSlu8ftGKNeVlbxX5RF1N8blwB5grAQMdzyUFwu6EzEEkPtRDdl6dKjyN~SWsvKOXaVwP3Jvstej5Wk3GJDSbB6c70HIstvzTdsBw02hri5lq-APBtKLSEy-KwQNlhAOmlPyoh9f9Rq06~0~4NPOqs4_&Key-Pair-Id=APKAJ62XWKZ35EOVO4XA on Feb. 6, 2020.

* cited by examiner

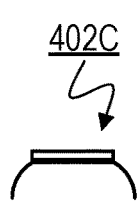
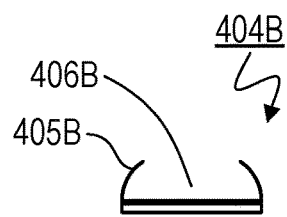
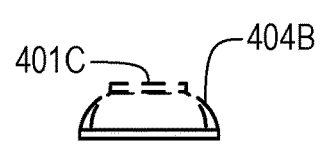
FIG. 12    FIG. 13    FIG. 14
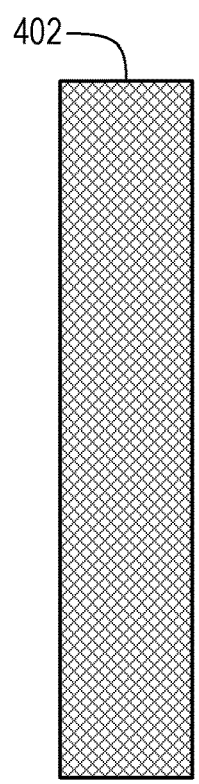
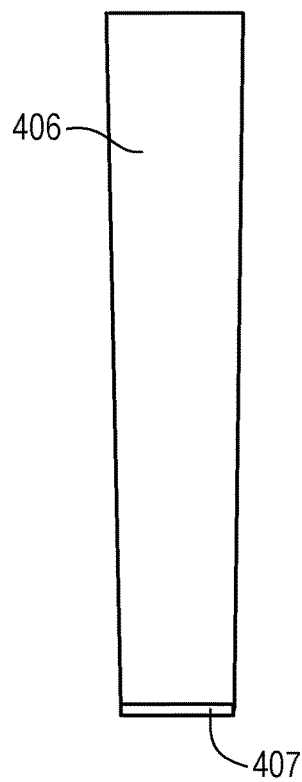
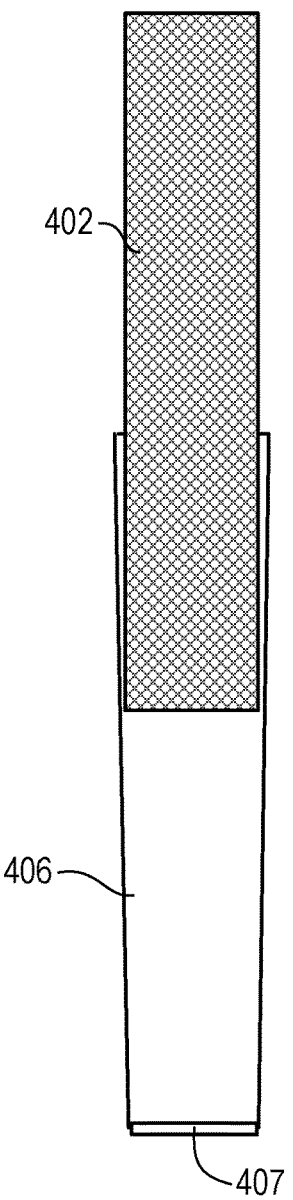
FIG. 15    FIG. 16    FIG. 17

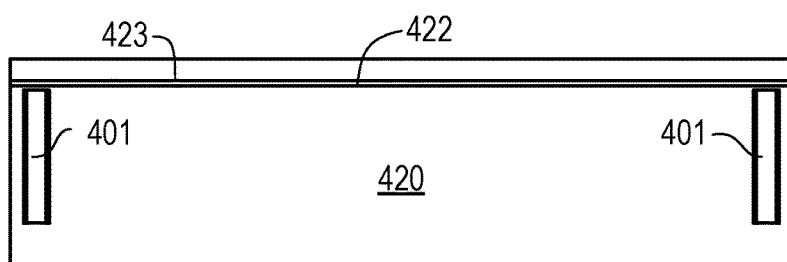
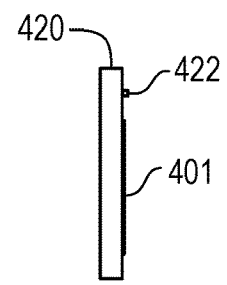
FIG. 18  FIG. 19
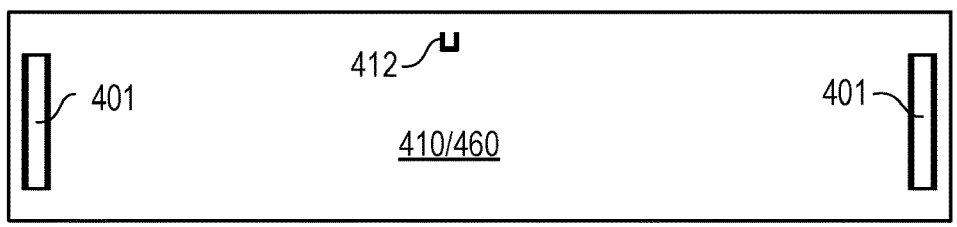
FIG. 20
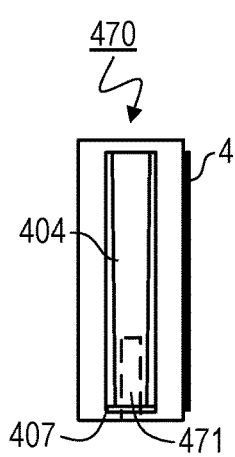 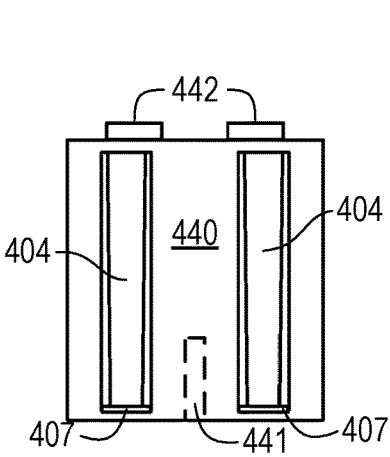 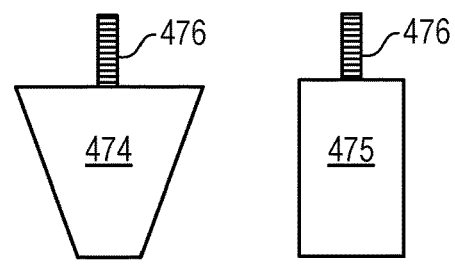 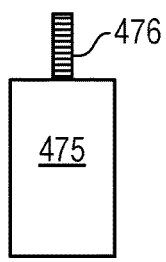
FIG. 21  FIG. 22  FIG. 23A  FIG. 23B
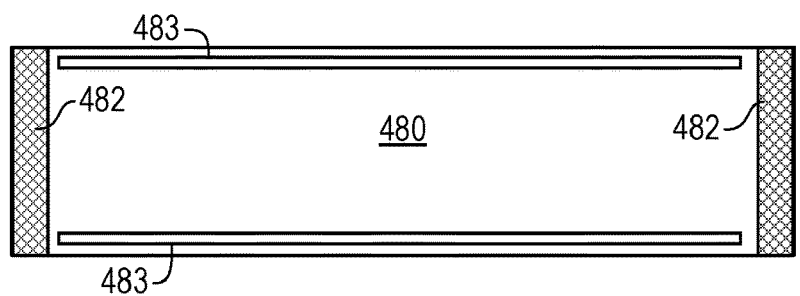
FIG. 24

MATTRESS FOUNDATION

This application is a continuation of U.S. patent application Ser. No. 16/545,557, filed Aug. 20, 2019, which is a continuation in part of U.S. patent application Ser. No. 15/646,408, filed on Jul. 11, 2017 (the '408 application), which is a continuation in part of U.S. patent application Ser. No. 15/606,126, filed on May 26, 2017 (the '126 application, now U.S. Pat. No. 10,188,217), which claims the benefit of U.S. Provisional Patent Application Ser. No. 62/448,333, filed on Jan. 19, 2017 (the '333 application), and U.S. Provisional Patent Application Ser. No. 62/404,263, filed on Oct. 5, 2016 (the '263 application). The present application also is a continuation in part of U.S. patent application Ser. No. 15/468,291, filed Mar. 24, 2017 (the '291 application). The foregoing applications, collectively referred to herein as the "priority applications", are incorporated by reference herein as though set forth herein in full.

FIELD OF THE INVENTION

The present invention pertains, among other things, to foundations for beds and mattresses that can be easily collapsed for moving or storage and then easily set up (or assembled) for use.

BACKGROUND

A bed or mattress foundation, sometimes referred to as a box frame or a box spring (even when the structure does not actually include any springs), underlies a bed's mattress, providing support for the mattress and preventing it from sagging. Such a foundation typically can be used to support any of a variety of different types of mattresses, such as memory foam, latex, innerspring or airbed mattresses. The foundation can be used with a bed frame underneath it, or in some cases legs, feet, gliders or the like are attached to it, and in such cases the foundation can be used without a separate bed frame.

One of the problems with most conventional foundations is that they are large and bulky, making them difficult to store and/or move (e.g., ship to a house and/or carry it to the desired room within a house). Several attempts have been made to provide a bed foundation that can be folded, collapsed or otherwise made smaller for transportation and/or storage. However, each such foundation has its own deficiencies, such as an inability to collapse the foundation down to a sufficiently small size, excessive difficulty in collapsing and/or setting up the foundation, etc.

SUMMARY OF THE INVENTION

The present invention addresses these issues by, among other things, providing mattress or bed foundations that can be easily collapsed down to a very small size and/or easily set up for use.

For instance, a foundation according to a first representative embodiment of the present invention preferably includes a headboard end panel assembly having a first end and a second end; a footboard end panel assembly having a first end and a second end; a left side panel assembly having a first end and a second end; and a right side panel assembly having a first end and a second end. The first end of the left side panel assembly detachably attaches to the first end of the headboard end panel assembly, the second end of the left side panel assembly detachably attaches to the first end of the footboard end panel assembly, the first end of the right side panel assembly detachably attaches to the second end of the headboard end panel assembly, and the second end of the right side panel assembly detachably attaches to the second end of the footboard end panel assembly. Each of the left side panel assembly and the right side panel assembly includes two side panel subassemblies that are attached together end-to-end when in use but that can be arranged substantially parallel to each other when not in use.

A foundation according to a second representative embodiment of the present invention preferably includes: two end panel assemblies (one at the head of the foundation and one at its foot), a plurality of side panels and at least one crossmember support, each of which including a mechanism for slidably interconnecting with one or more of such other components (which includes a mating sliding mechanism).

A foundation according to a third representative embodiment of the present invention preferably includes: a headboard end panel assembly, a footboard end panel assembly, a left side panel assembly, and a right side panel assembly, each having a first end and a second end. The first end of the left side panel assembly slidably engages with the first end of the headboard end panel assembly, thereby forming a first corner attachment. The second end of the left side panel assembly slidably engages with the first end of the footboard end panel assembly, thereby forming a second corner attachment. The first end of the right side panel assembly slidably engages with the second end of the headboard end panel assembly, thereby forming a third corner attachment. The second end of the right side panel assembly slidably engages with the second end of the footboard end panel assembly, thereby forming a fourth corner attachment.

A foundation according to a fourth representative embodiment of the present invention includes: a head end panel assembly; a foot end panel assembly; a left side panel assembly; and a right side panel assembly. The first end of the left side panel assembly slidably attaches to the first end of the head end panel assembly via a first sliding mechanism, the second end of the left side panel assembly slidably attaches to the first end of the foot end panel assembly via a second sliding mechanism, the first end of the right side panel assembly slidably attaches to the second end of the head end panel assembly via a third sliding mechanism, and the second end of the right side panel assembly slidably attaches to the second end of the foot end panel assembly via a fourth sliding mechanism. Each of the foregoing slidable attachments can be direct, where the two components directly slidably attach to each other, or indirect, where they slidably attached to each other indirectly through an intermediate component to which each slidably attaches. At least one of the first sliding mechanism, the second sliding mechanism, the third sliding mechanism, and the fourth sliding mechanism includes an elongated slot and an elongated protruding element that fits within the elongated slot. A horizontal cross-section of the elongated slot and/or the elongated protruding element includes thin elongated flexible arms, attached at their proximal ends to a common surface, but otherwise extending away from such common surface and separated from each other. When viewed from the horizontal cross-section, the average thickness of the thin elongated flexible arms is substantially less than the length of the thin elongated flexible arms.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the accompanying drawings. However, it should be understood that the drawings merely depict certain representative and/or exemplary embodiments and features of the present invention and are not intended to limit the scope of the invention in any manner. The following is a brief description of each of the accompanying drawings.

FIG. 12 is a top cross-sectional view of a third embodiment of a component having an elongated tab which functions as one side of a sliding mechanism;

FIG. 13 is a top cross-sectional view of a component having an elongated slot which functions as the other side of a sliding mechanism according to the third embodiment;

FIG. 14 is a top cross-sectional view of the elongated tab and the elongated slot, according to the third embodiment, as engaged with each other;

FIG. 15 is a front cross-sectional view of an elongated tab according to the present invention;

FIG. 16 is a front cross-sectional view of an elongated tapered or wedge-shaped slot according to the present invention;

FIG. 17 is a front cross-sectional view of an elongated tab and an elongated slot, engaging with each other, with the tab partially inserted within the slot;

FIG. 18 is a front elevational view of the inner surface of a side panel assembly;

FIG. 19 is a right side elevational view of the inner surface of the side panel assembly;

FIG. 20 is a front elevational view of the inner surface of an end panel assembly;

FIG. 21 is a front elevational view of a corner piece;

FIG. 22 is a side elevational view of a crossmember assembly;

FIGS. 23A&B are front elevational views of two different versions of a leg/glider;

FIG. 24 is a front elevational view of the inner surface of a top panel;

DESCRIPTION OF THE PREFERRED EMBODIMENT(S)

Figure 1:
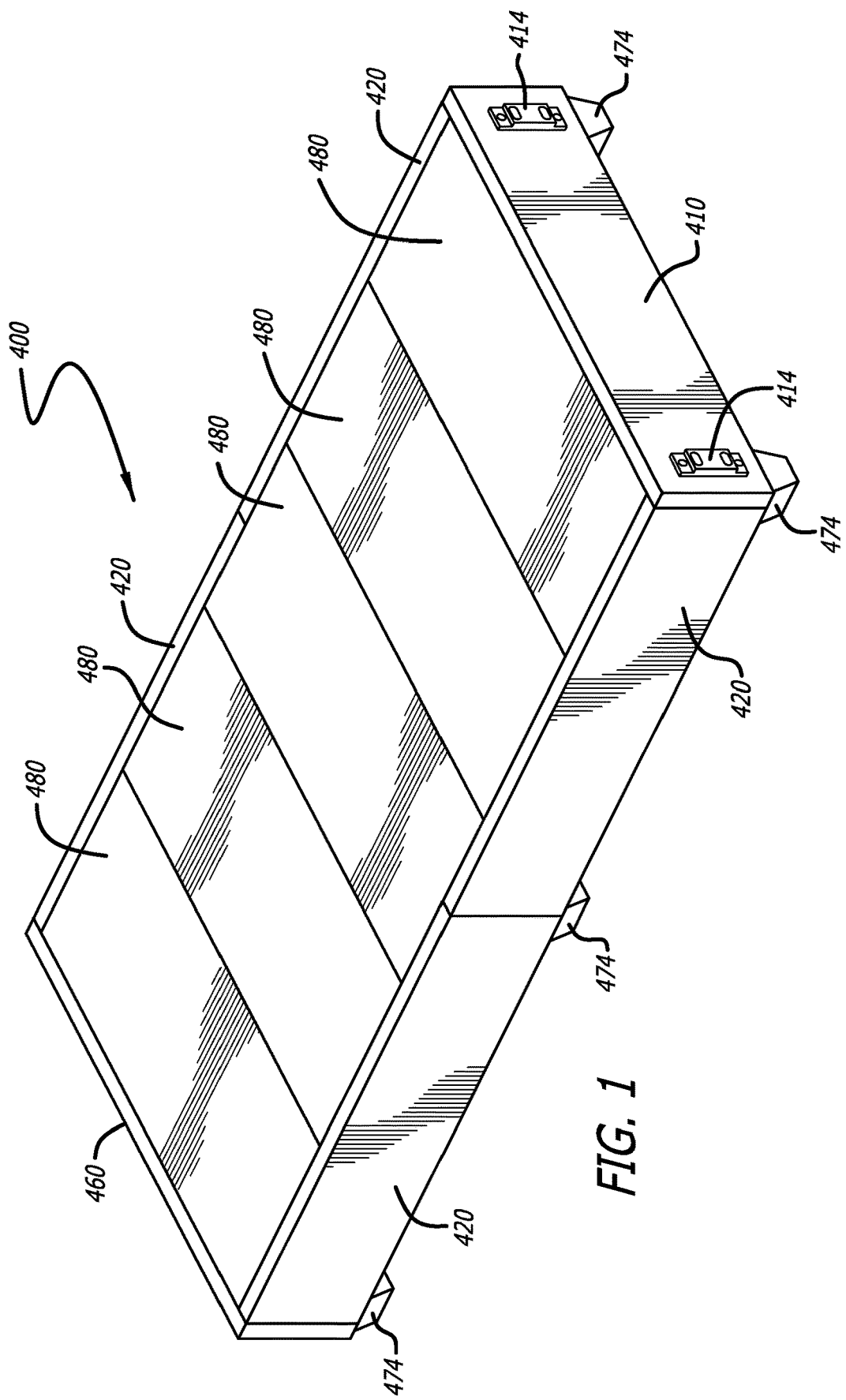
FIG. 1 is a perspective view of a fully assembled mattress foundation according to a representative embodiment of the present invention.

A collapsible bed foundation 400 according to a representative embodiment of the present invention is discussed in reference to the attached drawings. In the current embodiment, as shown in FIGS. 1 and/or 7, foundation 400 includes a headboard end panel assembly 410 (which optionally includes headboard brackets 414 on its outwardly facing surface), a plurality of side panel subassemblies 420, a crossmember assembly 440, a footboard end panel assembly 460 (which optionally includes footboard brackets, e.g., identical to headboard brackets 414, on its outwardly facing surface), a plurality of corner pieces 470, a plurality of feet, legs or gliders 474 (for convenience and without loss of generality, just referred to as legs 474 herein), and a plurality of top panel assemblies 480. Certain notable feature of the present embodiment are: (1) foundation 400 can be assembled very quickly and without using any tools or separate hardware, such as screws, bolts, washers or nuts; and (2) foundation 400 can be disassembled into relatively small components and, therefore, stored in a box with small dimensions.

Each of the headboard end panel assembly 410, side panel subassemblies 420, crossmember assembly 440, footboard end panel assembly 460, corner pieces 470 and top panel assemblies 480 preferably is primarily made of wood, with some additional hardware attached, as discussed in more detail below. For instance, the main structure of each of the headboard end panel assembly 410 (e.g., headboard panel 411), side panel subassemblies 420 (e.g., each side panel 421), footboard end panel assembly 460 (e.g., footboard end panel 461) and top panel assemblies 480 (e.g., each top panel 481) preferably is a rectangular panel that is made of wood, at least 1 inch thick (and, more preferably, at least 1.5 inches thick), at least 24 (and, more preferably, at least 30) inches long, and with mounting hardware (preferably made of steel or another metal) attached. However, in alternate embodiments, such panels 411, 421, 461 and 481 are made of polymer(s), composite(s) or other type(s) of materials, such as relatively strong but lightweight materials.

Figure 2:
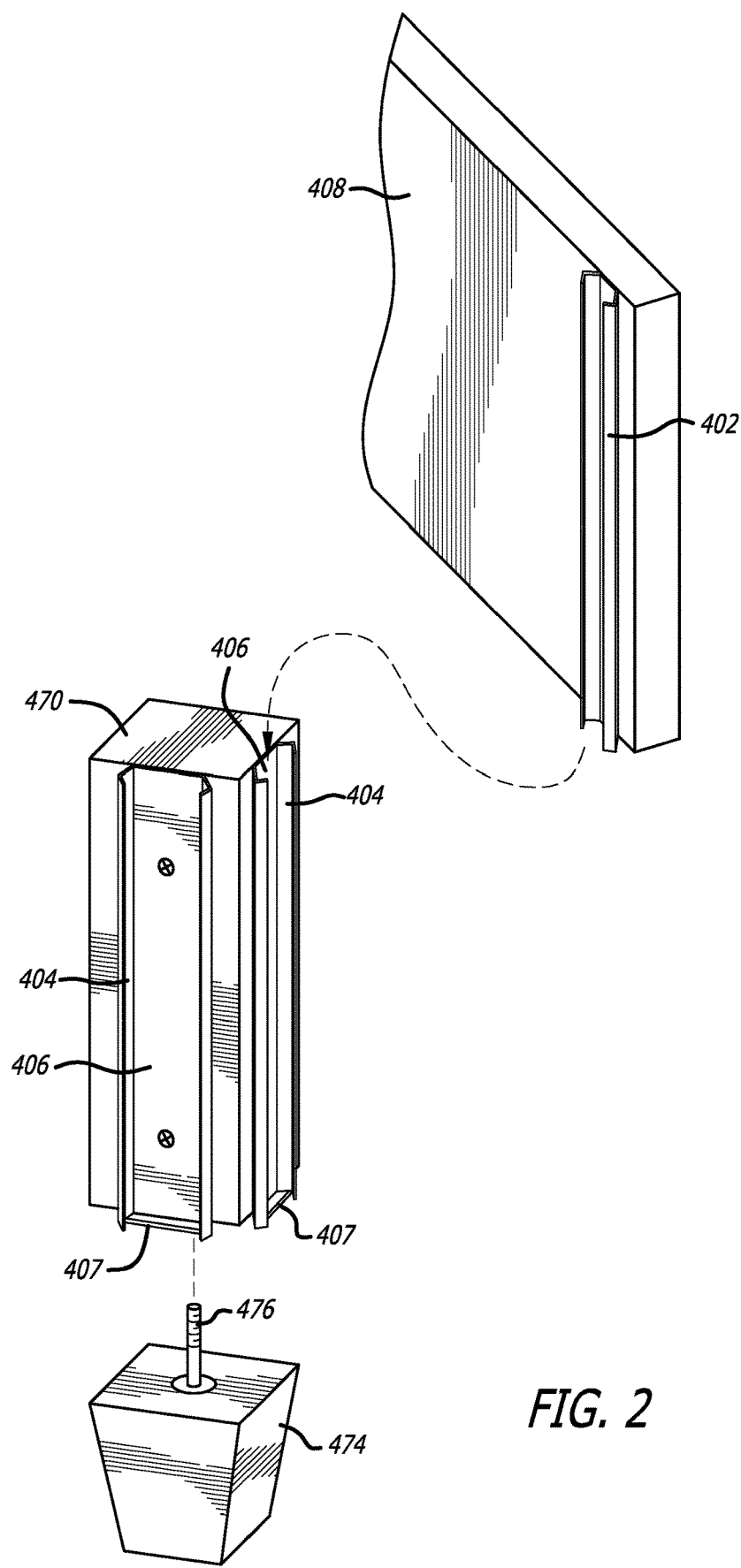
FIG. 2 is an exploded perspective view of a subassembly that includes a leg/glider, a corner piece, and portion of a panel with a sliding mechanism for attaching to one side of the corner piece.
Figure 3:
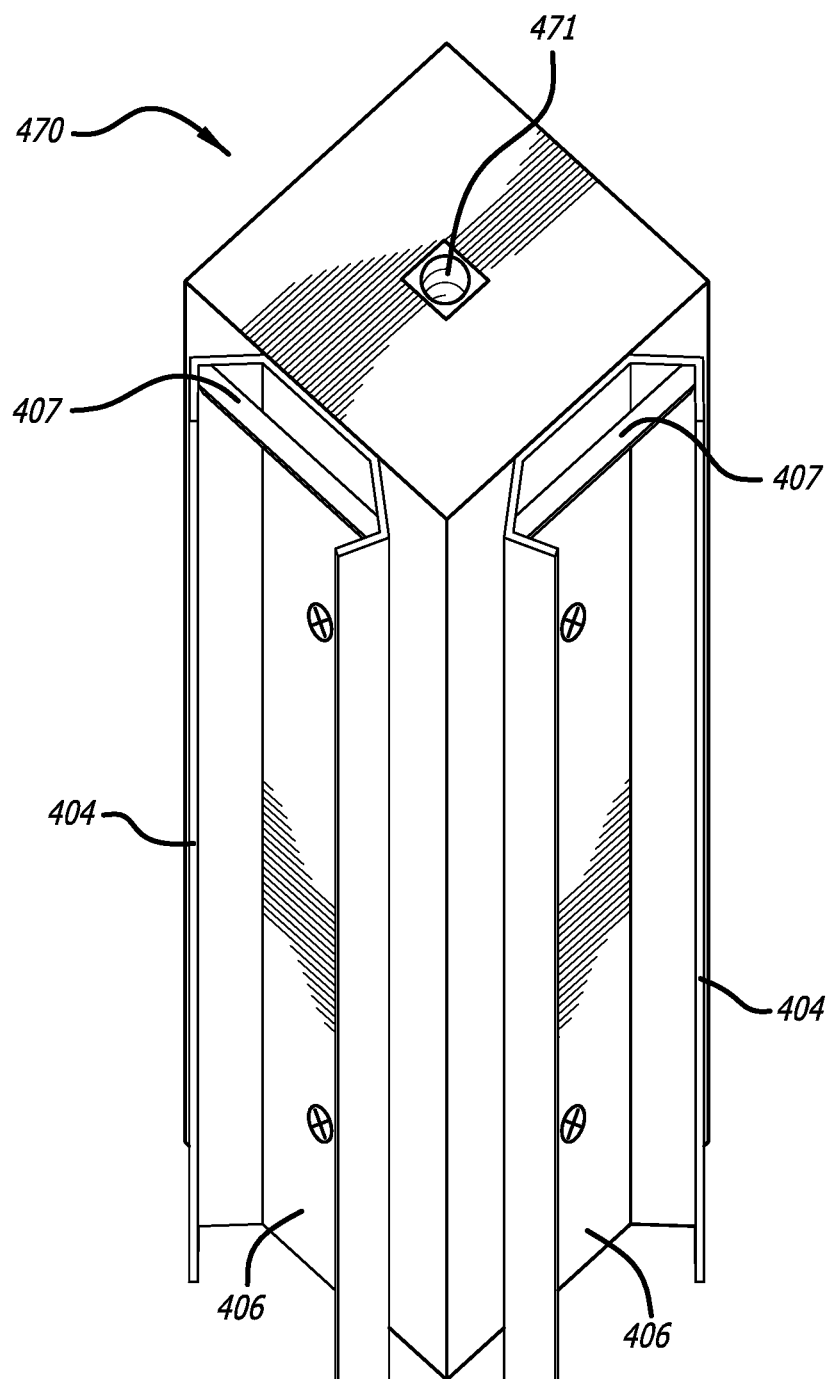
FIG. 3 is a bottom perspective view of a corner piece.

Preferably, in order to avoid any need for using tools or other attachment hardware (such as screws, bolts, nuts, washers, etc.), the various main components of foundation 400 simply slide together for assembly and then can be slid apart in order to disassemble the foundation 400 (e.g., for storage and/or transportation). An example of the preferred sliding mechanism is shown in FIG. 2, which illustrates how a corner piece 470 attaches to a panel 408 (which, e.g., could be a headboard end panel 411, a side panel 421 or a footboard end panel 461). In addition, FIGS. 2 and 3 show how a leg 474 attaches to the corner piece 470, by screwing its threaded post 476 into the threaded female threaded opening 471 in the bottom surface of corner piece 470. As shown in FIGS. 2 and 3, each of two adjacent sides of corner piece 470 includes an elongated sliding assembly 404, defining an elongated slot 406, into which a matching elongated protruding element or tab 402 can be inserted from the top of slot 406 and slid down until encountering stop 407 (at the bottom of slot 406). The other two sides of the corner piece 470 (generally not shown) can be open, e.g., in order to save weight and material, or can be provided with plain rectangular panels, e.g., for additional strength. In any event, for aesthetic purposes, the main structure of the entire corner piece 470 (as well as the main structure of each other main component, such as end panel assembly 410, side panel subassemblies 420, crossmember assembly 440, footboard end panel assembly 460 and top panel assemblies 480) preferably is covered in fabric material (e.g., black).

The sliding structure illustrated in FIG. 2 (i.e., with an elongated slot 406 on one component and an elongated protruding element or tab 402 on another component to which it attaches) preferably is used for attaching all of the major components of foundation 400. However, in alternate embodiments different structures are used. For instance, rather than an elongated protruding element or tab 402, a relatively small (e.g., circular) protruding element can be used in combination with a keyhole-shaped slot, as described and illustrated more fully in the priority applications.

Figure 4:
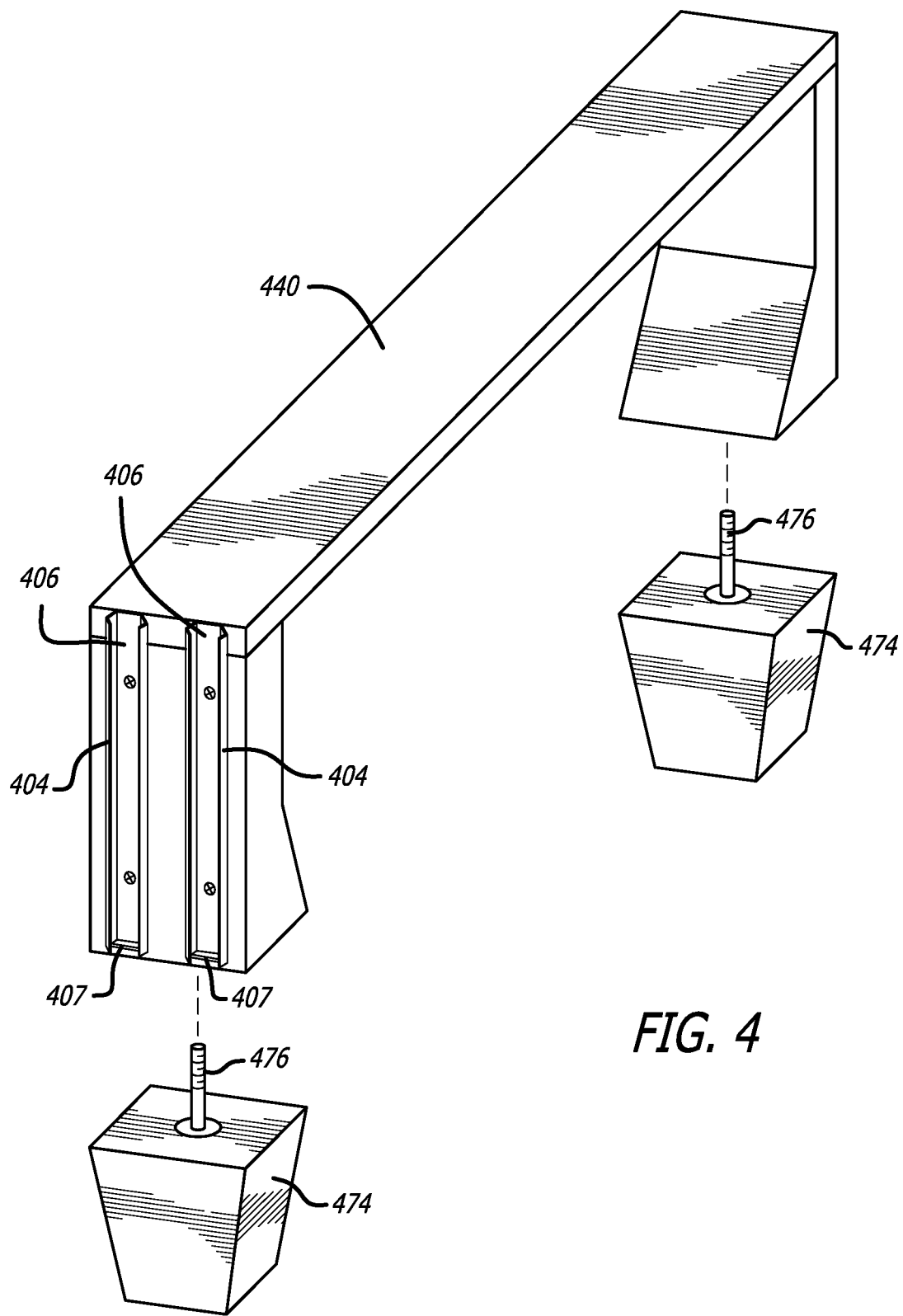
FIG. 4 is a perspective of a crossmember assembly.
Figure 5:
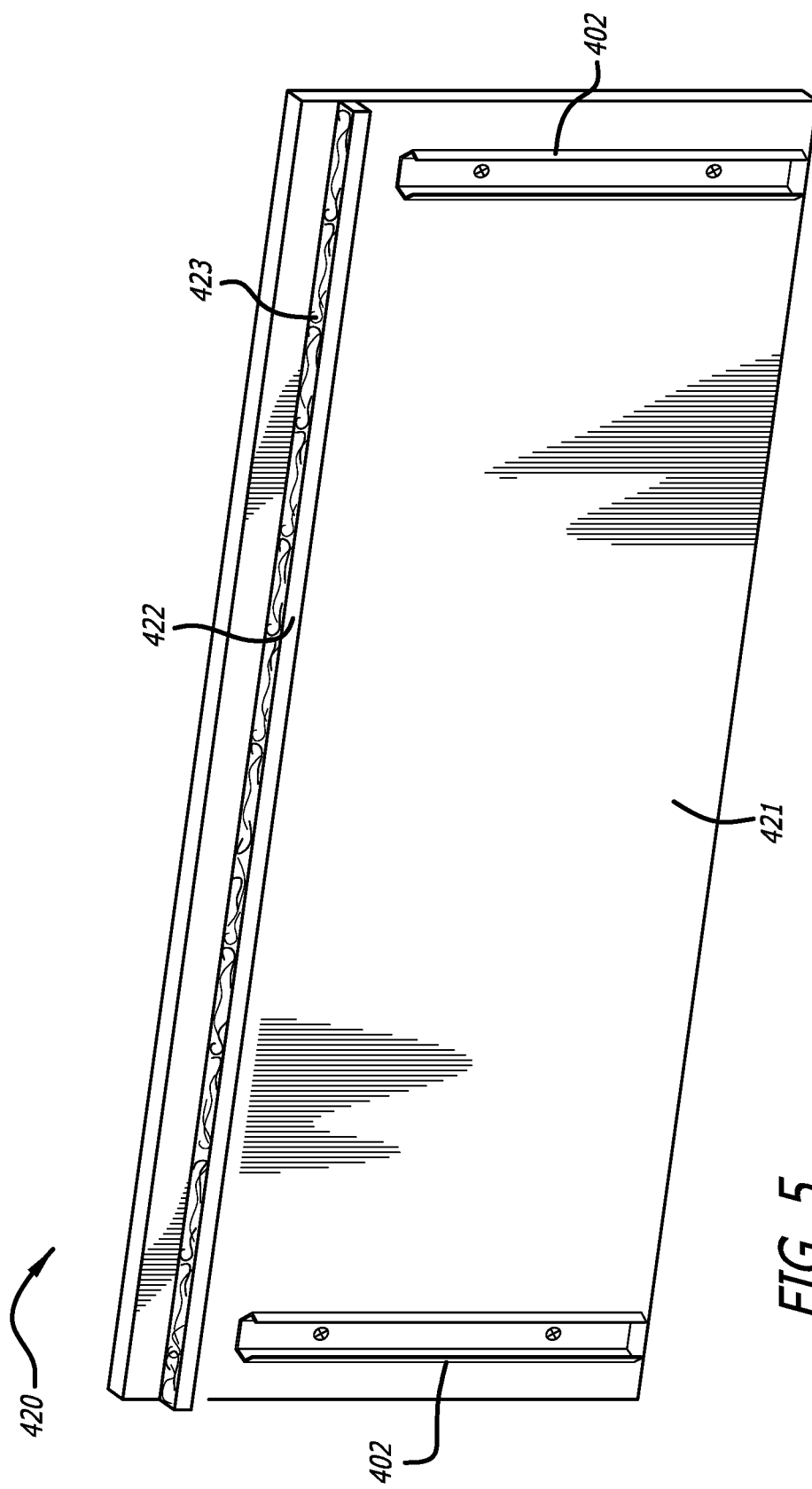
FIG. 5 is a perspective view of the inner surface of a side panel.

In the current embodiment, two side panel subassemblies 420 are attached together (as discussed below) to provide a side panel assembly, and a crossmember assembly 440 (e.g., as shown in FIG. 4) extends laterally between the left and right side panel assemblies (i.e., parallel to the headboard end panel assembly 410 and the footboard end panel assembly 460). More specifically, in the current embodiment, each of the left and right side panel assemblies of foundation 400 is comprised of two end-to-end side panel subassemblies 420, which are indirectly joined together by slidably attaching them to the same end of the crossmember assembly 440. As shown in FIG. 5, each such side panel subassembly 420 preferably includes a panel 421 (which forms its main structure), a ledge 422 (discussed in greater detail below) extending inwardly from the inner surface of panel 421, and an elongated protruding element or tab 402 on the inner surface of panel 421 at or near each end. As a result of this structure, when two such side panel subassemblies 420 are arranged end-to-end, their proximal ends collectively provide, in relatively close proximity, two parallel protruding elements or tabs 402.

As indicated in FIG. 4, each end of crossmember assembly 440 preferably includes two corresponding parallel elongated sliding assemblies 404 (defining corresponding elongated slots 406) with the same spacing (although only one end is shown in FIG. 4, the other end preferably is identical), so that each of the end-to-end side panel subassemblies 420 (on each side of the foundation 400) can be attached to the same end of the crossmember assembly 440 by simply sliding them together (i.e., by sliding the bottom end of each such protruding element 402 on the proximal end of a side panel subassembly 420 into the top end of one of the slots 406 provided at the end of the crossmember assembly 440). As a result, the two end-to-end side panel subassemblies 420 and the perpendicularly oriented crossmember assembly 440 are all attached together in a "T" configuration. As indicated in FIG. 22, on the bottom surface of the crossmember assembly 440, near each of its two ends, is a threaded female opening 441 (similar to opening 471) for accepting the threaded post 476 of one of the legs 474.

As shown in FIG. 4, in the current embodiment crossmember assembly 440 is comprised of a lateral crossmember beam, with a downwardly extending, perpendicularly oriented end section (which provides the sliding assemblies 404 and the threaded female openings 441) at each of its ends. However, in alternate embodiments (e.g., where additional strength is desired), crossmember assembly 440 can be provided as a single solid rectangular beam (e.g., with a solid structure between the downwardly extending, perpendicularly oriented end sections). In the current embodiment, the distal ends of the two end-to-end side panel subassemblies 420 attach (e.g., in a similar manner) to one side of a corner piece 470, with a headboard end panel assembly 410 or a footboard end panel assembly 460 attaching to an adjacent side of such corner piece 470 (e.g., so that such panels are at least approximately perpendicular to each other). In alternate embodiments, each corner piece 470 can be considered part of a subassembly 420, a headboard end panel assembly 410 or a footboard end panel assembly 460, or the side panel subassemblies 420 can otherwise attached directly to a headboard end panel assembly 410 or a footboard end panel assembly 460.

Figure 6:
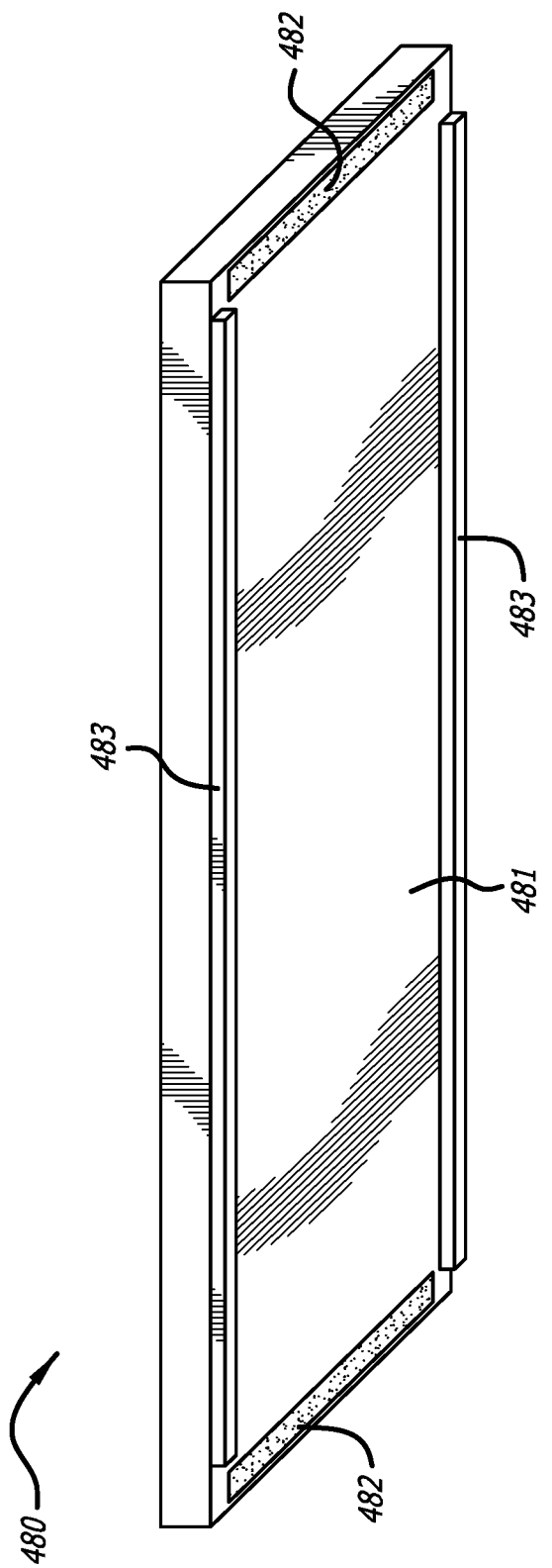
FIG. 6 is a perspective view showing the bottom surface of a top panel.
Figure 7:
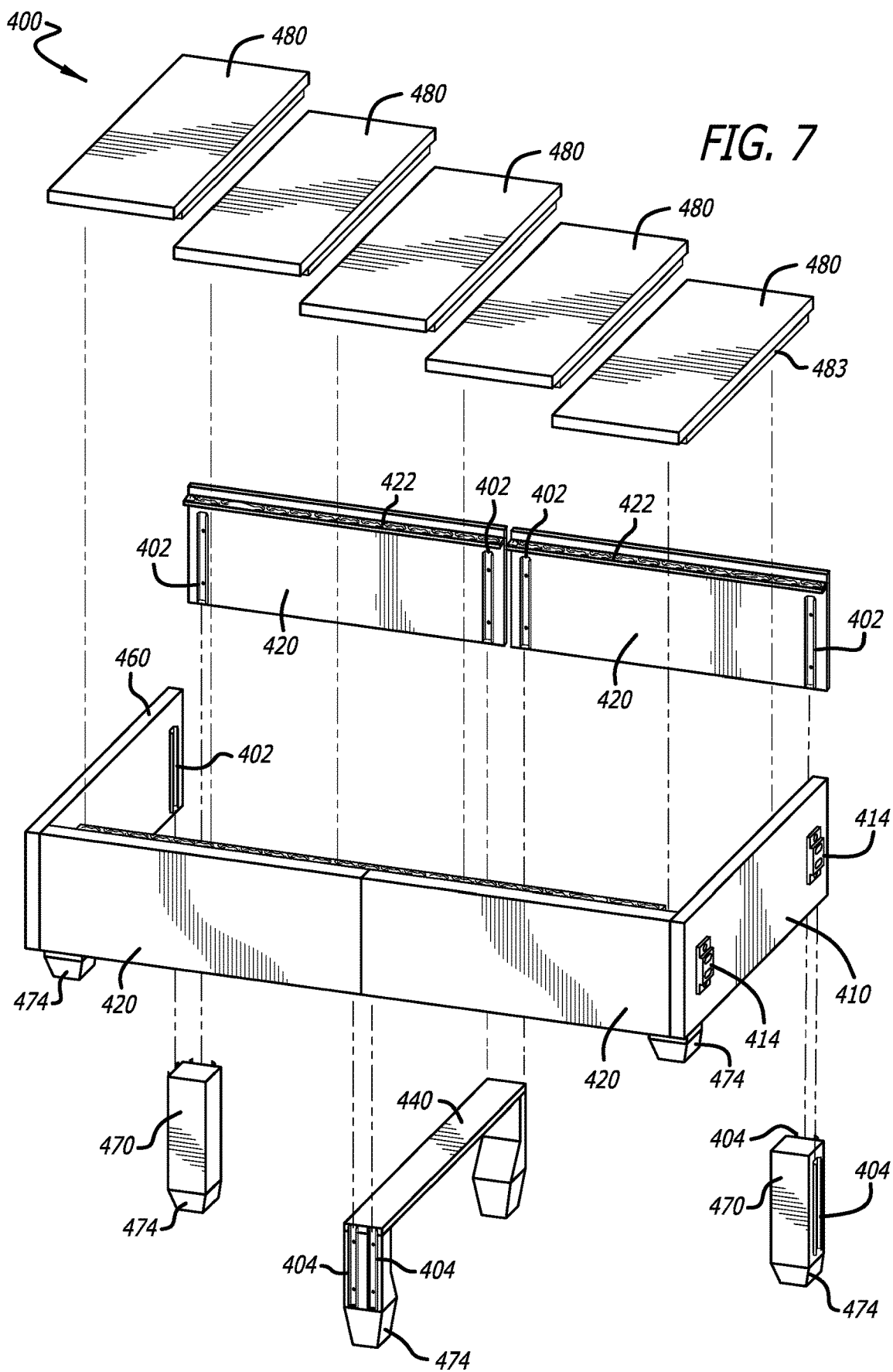
FIG. 7 is a partially exploded perspective view of the mattress foundation.

Once the individual side panel subassemblies 420, crossmember assembly 440, headboard end panel assembly 410 and footboard end panel assembly 460 have been attached in the foregoing manner, and the legs/gliders 474 have been screwed into the respective threaded female openings 441 and 471, the foundation 400 is completed by simply laying the top panels 480 laterally across the foundation 400, so that each extends between the two (left and right) side panel assemblies. For this purpose, the top surface 423 of each ledge 422 preferably is provided with a high-density hook or loop material (e.g., commonly sold under the trademark Velcro), and a strip of mating high-density loop or hook material 482 is provided on the bottom surface of each end (i.e., each short side) of top panel 481 (e.g., as shown in FIG. 6), in order to help maintain each such top panel 480 in position. Alternatively, or in addition, other means for securely attaching the top panel assemblies 480 (such as snap-fit mechanisms, magnets or temporary adhesive) may be used, or such a securing means may be omitted entirely. As also shown in FIG. 6, each long side edge of each top panel 481 preferably is provided with a rail 483 (e.g., glued and/or nailed on, also made of wood, and having a square or rectangular cross-section) for reinforcement. Alternatively, as described in the priority applications, similar rails can be provided as separate components (e.g., unattached to the top panel assemblies 480). FIG. 7 illustrates the various components of foundation 400 and how they attach to each other. The discussion below provides additional detail in this regard, as well as certain variations on the structures discussed above.

Figure 8:
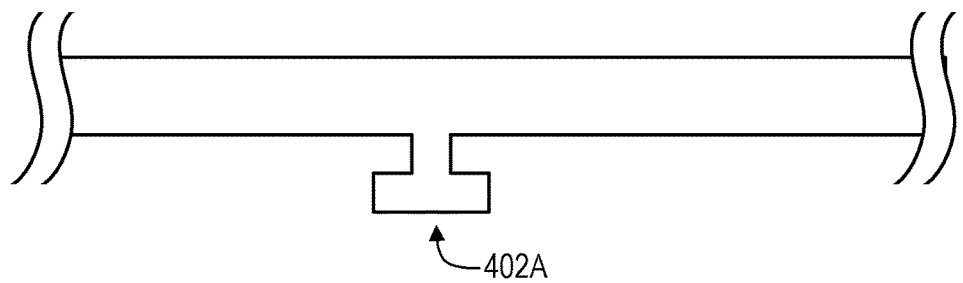
FIG. 8 is a top cross-sectional view of a first embodiment of a component having an elongated tab which functions as one side of a sliding mechanism.
Figure 9:
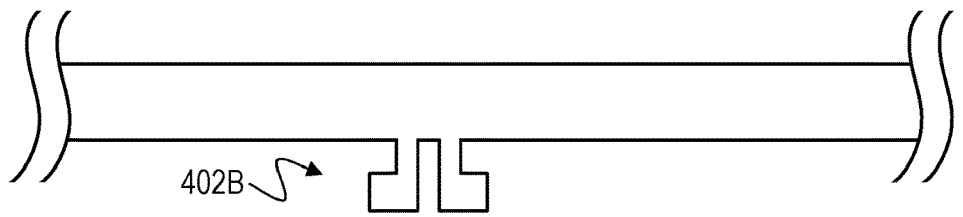
FIG. 9 is top cross-sectional view of a second embodiment of a component having an elongated tab which functions as one side of a sliding mechanism.

In the preferred embodiments, as noted above and discussed in greater detail below, the principal mounting hardware for a foundation according to the present invention is a first sliding mechanism that mates with a compatible second sliding mechanism on another component to which the first subject component attaches. That is, in the preferred embodiments, the major components of foundation 400 (e.g., end panel assemblies 410 and 460, corner pieces 470, side panel subassemblies 420 and crossmember assembly 440) simply slide together. For this purpose, in the current embodiment, each of the headboard end panel assembly 410, the plurality of side panel subassemblies 420, and the footboard end panel assembly 460 is provided with a first type of sliding assembly, while each of the crossmember assembly 440 and the plurality of corner pieces 470 is provided with a second type of sliding assembly which mates with the first type. The first type, sliding assembly 402 can be implemented, e.g., as sliding assembly 402, already discussed above and shown in FIG. 2, as sliding assembly 402A, shown in FIG. 8, sliding assembly 402B, shown in FIG. 9, or sliding assembly 402C, shown in FIG. 12 and includes an elongated protruding element or tab has a narrower proximal section, where it extends from the subject component, and terminates in a wider distal section.

Figure 10:
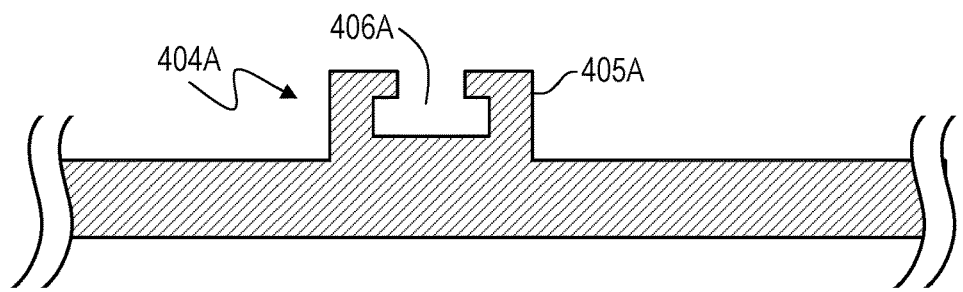
FIG. 10 is a top cross-sectional view of a component having an elongated slot which functions as the other side of a sliding mechanism.
Figure 11:
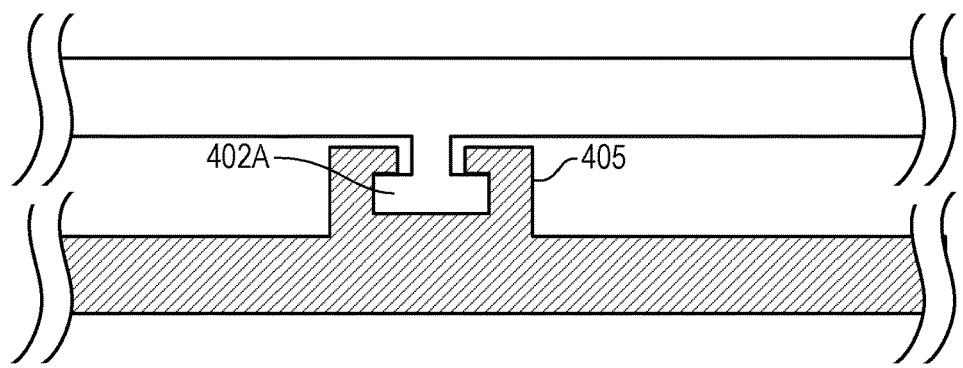
FIG. 11 is a top cross-sectional view of an elongated tab and an elongated slot, as engaged with each other.

In the current embodiment, the second type, sliding assembly 404 (e.g., sliding assembly 404, as shown in FIGS. 2 and 3, sliding assembly 404A, defining an elongated slot 406A as shown in FIG. 10, or sliding assembly 404B defining an elongated slot 406B, as shown in FIG. 13), includes a partial wraparound structure 405 (e.g., the wraparound structure, as shown in FIGS. 2 and 3, wraparound structure 405A, as shown in FIG. 10, or wraparound structure 405B, as shown in FIG. 13) that defines an elongated slot 406 (e.g., slot 406, as shown in FIGS. 2 and 3, slot 406A, as shown in FIG. 10, or slot 406B, as shown in FIG. 13), which has a narrower opening along its length and is wider in its interior portion. As a result, the wider distal end of the elongated protruding tab 402 can simply be slid into the elongated slot 406, e.g., by inserting the bottom end of protruding tab 402 into the top end of elongated slot 406, e.g., with the result shown in FIG. 11, thereby joining the two components together. As will be readily appreciated, such a configuration fixedly joins the two components together, other than potential up or down movements relative to one another, which potential linear motion can be addressed, e.g., in any of the ways discussed below. Because the longitudinal opening to slot 406 is narrower than the wider distal end 403 of the elongated protruding tab 402, the two components cannot be simply pulled apart. Instead, if one wished to separate them, they would have to be slid apart.

It is noted that other structures and mechanisms for allowing two components to slide together (e.g., in the foregoing manner) instead may be used. For instance, rather than attaching a separate sliding bracket to the subject components, the components themselves may be formed with such tabs or slots/grooves (e.g., integral with their structures, such as by molding them to have such features or cutting such features into them). Also, any of the sliding mechanism structures described in the priority applications instead (or in addition) may be used. Finally, except to the extent expressly and specifically stated otherwise, it is noted that any references herein to two components slidably engaging with each other can encompass direct engagement with each other (e.g., with the corresponding sliding mechanisms directly attached to or otherwise incorporated within such components) or indirect engagement with each other (e.g., with either or both of such components slidably engaging with a third component which is attached to or can attach to the other component).

The decision as to which components will include the slot feature and which will include the tab or protruding-element feature can be made to achieve other desired goals. For instance, the selection and placement in the current (preferred) embodiment reduces the number of different types of components that must be produced. A similar result could be achieved by reversing the assignment, with each of the crossmember assembly 440 and the plurality of corner pieces 470 being provided with the first type of sliding assembly discussed above, and each of the headboard end panel assembly 410, the plurality of side panel subassemblies 420, and the footboard end panel assembly 460 being provided with the second type of siding assembly discussed above.

Two different locking or holding mechanisms preferably also are incorporated into the mating/sliding assemblies in the current embodiment. First, while the elongated tab or protruding element 402 has a uniform width along its entire length, e.g., as shown in FIG. 15, the elongated slot 406 is tapered toward the bottom, e.g., as shown in FIG. 16. As a result, a friction fit is achieved as tab 402 is slid down into slot 406 (as shown in FIG. 17), thereby making it less likely that the two components will accidentally separate from each other. In addition, at the bottom of slot 406 is a stop 407, which: (1) prevents tab 402 from being inserted too far (i.e., beyond stop 407), (2) helps to ensure that all the components will be level relative to each other (assuming all tabs are fully inserted), and (3) lets the user know when the tab 402 has been fully inserted. However, in alternate embodiments, either or both of stop 407 and/or the narrowing of slot 406 is omitted.

Also, other locking and/or holding mechanisms may be employed in addition to or instead of the foregoing. For instance, the elongated protruding tab or other element 402 could also (or instead) be tapered. In the preferred embodiments, however, at least one of the protruding element 402 or the slot 406 is tapered in order to provide the desired wedge fit. For this purpose, at least one of such components also has a horizontal cross-section that includes thin flexible arms (e.g., wraparound structure 405, as shown in FIGS. 2 and 3, wraparound structure 405A, as shown in FIG. 10, wraparound structure 405B, as shown in FIG. 13, pair of elements 402, shown in FIG. 2, or pair of elements 402C, shown in FIG. 12) for enhancing the friction fit. To further enhance this effect, in the embodiment shown in FIGS. 2 and 3, each of the protruding element 402 and the slot 406 has a horizontal cross-section that includes thin flexible arms.

Other means can also be employed for helping the two components remain engaged. For instance, in addition to, or instead of, such a tapering feature, the combination of a dimple in one component and a hole in the other would help hold the two together, when the dimple engages with the hole. Alternatively, a dimple could be used without a corresponding hole, thereby providing added friction. Still further, pin-and-hole combinations could be used, either with a manually inserted pin or a spring-loaded (e.g., manually retractable) pin.

In the current specific embodiment, each end of the inner surface of each side panel subassembly 420 (e.g., as shown in FIGS. 5 and 18), as well as the headboard end panel assembly 410 and the footboard end panel assembly 460 (which, as shown in FIG. 20, are identical in the current embodiment) is provided with a sliding assembly 402. Also, in this embodiment each of two adjacent sides of each corner piece 470 is provided with a sliding assembly 404 (e.g., as shown in FIGS. 2, 3 and 21), and each side edge of the crossmember assembly 440 (as shown in FIGS. 4 and 22) is provided with two parallel sliding assemblies 404, one at the front edge and one at the rear edge.

As a result of this configuration, a side panel subassembly 420 can be attached to one side of a corner piece 470 and the headboard end panel assembly 410 or the footboard end panel assembly 460 can be attached to the adjacent side of the same corner piece 470, thereby joining the two components together. In addition, along each side, two side panel subassemblies 420 can be attached, end to end to each other and also to the end surface of the crossmember assembly 440, by simply slidably attaching the sliding assembly 402 at the proximal end of each of the two side panel subassemblies 420 to one of the two parallel sliding assemblies 404 along one end of the crossmember assembly 440. The resulting configuration is shown, e.g., in FIG. 25.

Although only a single crossmember assembly 440 is used in the current embodiment, two or more crossmember assemblies 440 can be used in parallel to attach a corresponding three or more side panel subassemblies 420 end to end, e.g., depending upon the desired length of the foundation 400 and the desired length of each side panel subassembly 420 or, alternatively, depending upon the desired number of crossmember assemblies 440. Preferably, the gap, if any, between adjacent end-to-end side panel subassemblies 420 is small, such as less than 1 inch and, more preferably, less than ½ inch, ¼ inch or even ⅛ inch.

As shown in FIGS. 18 and 19 and noted above, in the current embodiment, each side panel subassembly 420 also has an inwardly extending relatively narrow ledge 422 on its inner surface, extending its entire length, parallel to its top edge and located a little bit below its top edge, e.g., so that the top surface of ledge 422 is not greater than 2 inches, 1 inch or ½ inch below the top edge of such side panel subassembly 420. In the completed foundation 400, the top surface of ledge 422 is provided with high-density hook or loop material (e.g., commonly sold under the name Velcro™) and serves as a surface for supporting the one of the ends of the top panels 480. In the current embodiment, the distance between the top surface 423 of ledge 422 and the top edge of such side panel subassembly 420 is approximately the same as the thickness of the top panels 480 that are used, so that in the completed foundation 400, the top edges of the side panel subassemblies 420 and the top surfaces of the top panels 480 are approximately coplanar. However, in alternate embodiments, the top surfaces of the top panels 480 are below the top edges of the side panel subassemblies 420 in the completed foundation 400, so that the mattress that is used fits inside and is thereby inhibited from moving relative to the top panels 480.

From the top of each leg 475 extends a threaded male member 476, so that the leg 475 can be screwed into a corresponding threaded female opening 471, which is provided in the bottom of each of the corner pieces 470, or into a corresponding threaded female opening 441, which is provided in the bottom surface at each end of the crossmember assembly 440. Also, in the current embodiment, each leg 474 has a tapered cross-section (narrower at the bottom than at the top, with the top dimensions matching the cross-section of the corner pieces 470). However, in alternate embodiments, each leg 475 instead has a square or rectangular cross-section that matches the cross-section of the corner pieces 470. However, in other embodiments, legs are used having a different cross-section (e.g., circular or otherwise rounded) and/or different sizes than the corner pieces 470 to which they attach. Also, in alternate embodiments, the legs (e.g., legs 474 or 475) are attached at other locations, to other components (e.g., to the headboard end panel assembly 410 and/or the footboard end panel assembly 460) and/or in other ways (e.g., using a snap-fit mechanism).

Still further, in certain embodiments, the legs (e.g., legs 474 or 475) are permanently attached to or integrally formed with the main components. However, for flexibility in use of the resulting foundation 400, as well as for ease of storage and shipment, it is generally preferable for the legs (e.g., legs 474 or 475) to be easily attachable/detachable. As to the former consideration, by omitting to attach the legs (e.g., legs 474 or 475), the resulting foundation 400 can be used in the same manner as a conventional box spring, within an existing bed frame, or as a standalone foundation without legs (thereby eliminating the space underneath the foundation 400), while attaching the legs (e.g., legs 474 or 475) allows foundation 400 to be used as a more traditional bed frame. Other benefits of detachable legs (e.g., legs 474 or 475) is that the user can select from different styles of legs (e.g., rounded or rectangular, parallel edges or tapered) and simply attach the desired kind, or can even attach casters (e.g., wheels) or other components for elevating the frame 400 above the floor, instead of plain legs or gliders.

In the preferred embodiments, although not generally shown in the drawings in order to better illustrate the functional structure of the preferred embodiment, the visible surfaces of the foundation 400 are covered in cloth or otherwise finished (e.g., painted, stained, or covered with a veneer) in order to accommodate the variety of uses described in the preceding paragraph. With such cloth covering or other finishing, even when foundation 400 is used as a box spring within an existing frame, a benefit is obtained, i.e., the ability to avoid using a separate dust ruffle while still maintaining an aesthetically pleasing appearance. Such a cloth covering, if used, can be made to conform exactly to the surfaces of the subject components. Alternatively, some or all the components may be covered in a manner so as to hide certain structural features, e.g., depending upon costs of manufacture and/or aesthetic considerations. For instance, either or both of the crossmember assembly 440 and/or the corner pieces 470 might be covered to appear as a simple rectangular prism. Although not typically shown in the drawings, the outer surfaces of the headboard end panel assembly 410 and/or the footboard end panel assembly 460 also can be provided with brackets (e.g., brackets 414) for attaching a headboard or a footboard, respectively.

Figure 27:
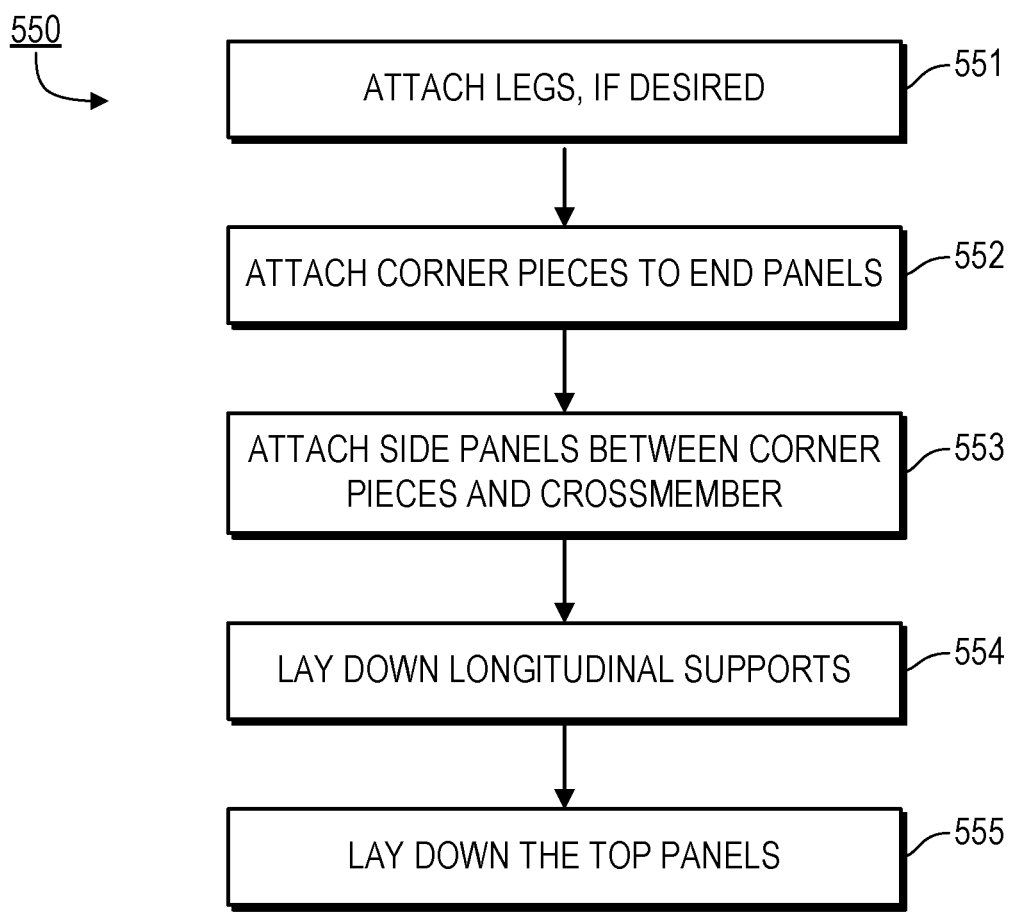
FIG. 27 is a flow diagram illustrating a process for assembling the foundation.

A method 550 for assembling foundation 400 is now described primarily in reference to FIG. 27. Initially, in step 551 a leg 474 (or 475) is attached to each of the four corner pieces 470 and to each end of crossmember assembly 440. In the current embodiment, the threaded male member 476 of each such leg 474 (or 475) is screwed into a corresponding female threaded opening 471 or 441, respectively. However, as noted above, this step 551 can be omitted, or a different component (such as a caster) instead may be attached in this step 551, depending upon the intended use and/or configuration of the completed foundation 400.

In step 552, a corner piece 470 is slid onto each end of the headboard end panel assembly 410 and the footboard end panel assembly 460, using the sliding assembly 402 at the end of the corresponding end panel assembly and one of the sliding assemblies 404 on the corresponding corner piece 470, such that the outer side of each corner piece 470 has an exposed (currently unused) sliding assembly 404. That is, in each case, the bottom edge of the sliding assembly 402 is inserted into the top edge of the sliding assembly 404, and the two are slid together until stop 407 is encountered.

Figure 25:
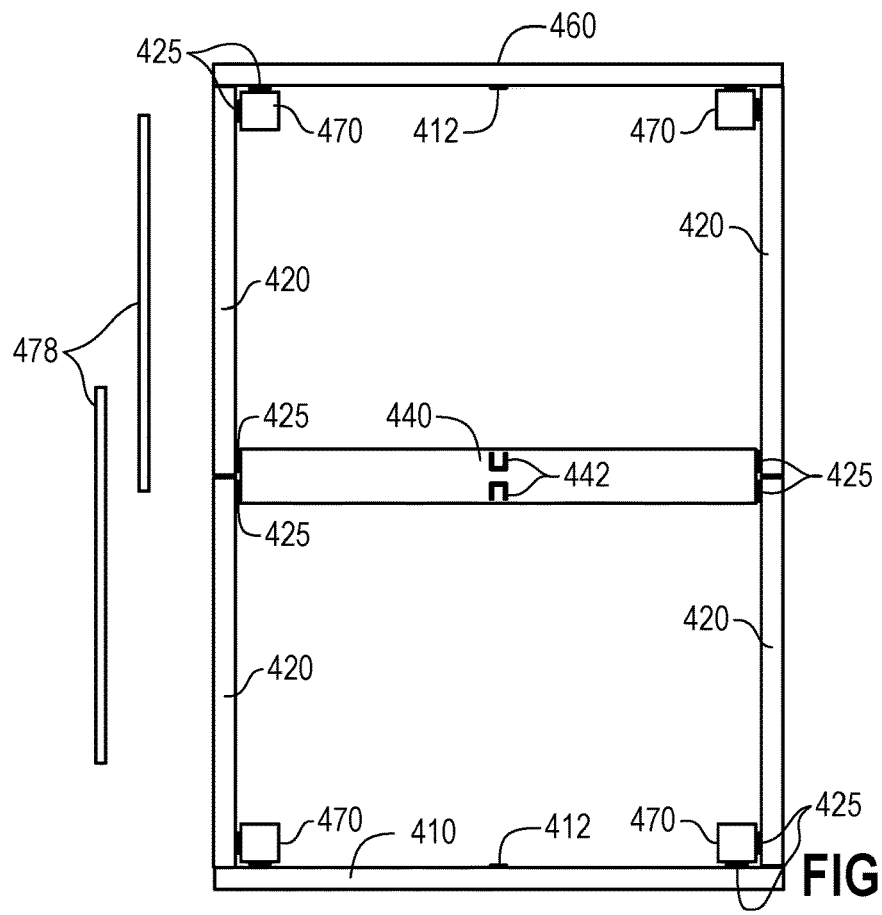
FIG. 25 is a top plan view of the completed foundation, other than the top panels, with the longitudinal supports set to the side, and with the inwardly extending edges on the side panel assemblies omitted in order to show other details of the construction.

In step 553, the sliding assembly 402 on one end of a side panel subassembly 420 is slid down onto the exposed sliding assembly 404 of one of the corner pieces 470, and the sliding assembly 402 on other end is slid down onto a sliding assembly 404 on the crossmember assembly 440 until stop 407 is encountered. This step is repeated for each of the four side panel subassemblies 420, so that the distal end of each side panel subassembly 420 attaches to an end panel (i.e., either headboard end panel assembly 410 or footboard end panel assembly 460), while its proximal end attaches to the crossmember assembly 440, and so that on each lateral side of the partially completed foundation 400, two side panel subassemblies 420 are arranged end-to-end to form a side panel assembly. The result of this step 553 is shown in FIG. 25, except that to better show the locations 425 at which the components are slidably attached to each other (using sliding assemblies 402 and 404), the ledges 422 are omitted from FIG. 25.

Figure 26:
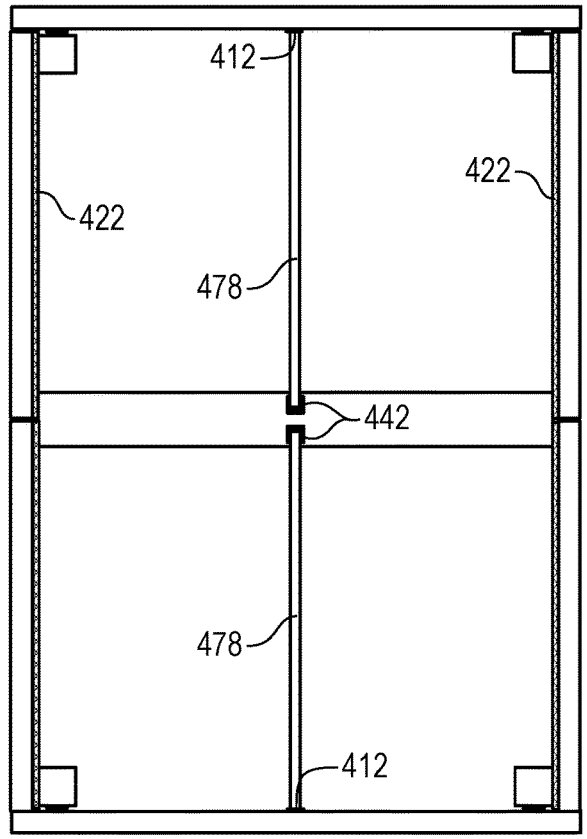
FIG. 26 is a top plan view of the completed foundation, other than the top panels.

Next, in certain alternate embodiments, in step 554 longitudinal supports 478 are laid down. For this purpose, a bracket 412 can be provided on the inner surface of each of the headboard end panel assembly 410 and the footboard end panel assembly 460 (as shown in FIG. 20), and a pair of brackets 442 (e.g., as shown in FIGS. 22 and 25, or just a single bracket that accommodates both longitudinal supports 478) can be provided on the top surface of crossmember assembly 440. In the current embodiment, each such longitudinal support 478 is laid between one of the brackets 412 and one of the brackets 442. The result of this step 554 is shown in FIG. 26.

Finally, in step 555 the top panels 480 are simply laid laterally across the top of the partially completed foundation 400, extending between the ledges 422 on opposite side panel subassemblies 420. In the current embodiment, five such top panels 480 are used, with the middle one overlying and supported by the crossmember assembly 440. Also, in the current embodiment the top panels 480 have strips of high-density hook or loop material (commonly sold under the brand name Velcro™) 482 on the bottom surface of its outer (shorter) ends, as shown in FIGS. 6 and 24, and the top surfaces 423 of the ledges 422 are covered with the mating high-density loop or hook material, in order to help secure top panels 480. However, in other embodiments such material is omitted, or other means (e.g., pins, magnets or snap-fit tabs and corresponding openings) are used to secure top panels 480 in place. In any event, the solid surface provided by panels 480 is particularly advantageous, allowing foundation 400 to be used, e.g., with a foam mattress.

As will be readily appreciated, the assembly method 550 involves just four or five simple steps that do not require any tools or separate hardware and can be performed in a matter of minutes. The process for disassembly (e.g., in order to store or transport the foundation 400) is simply the reverse of method 550, described above. Also, the steps of method 550 can be rearranged in different orders, as desired.

One significant advantage of foundation 400 is that it can be assembled from a very small number of different components. For example, in the current embodiment, the headboard end panel assembly 410 and the footboard end panel assembly 460 are identical to each other. Similarly, all of the side panel subassemblies 420 are identical to each other, all of the corner pieces 470 are identical to each other, all of the legs 474 (or 475) are identical to each other, and all of the top panel assemblies 480 are identical to each other, meaning that the foundation 400 can be assembled from two end panel assemblies (410 and 460), four side panel subassemblies 420, four corner pieces 470, six legs 474 (or 475), a single crossmember assembly 440, and five top panel assemblies 480. Still further, by appropriately sizing the foregoing components, different foundation sizes (e.g., twin, twin XL, full, Queen, King and California King) can be assembled using different numbers of such components from a common set of such components, thereby significantly reducing manufacturing costs. In some cases, especially for the larger sizes, one or two additional or different components may be used.

Figure 28:
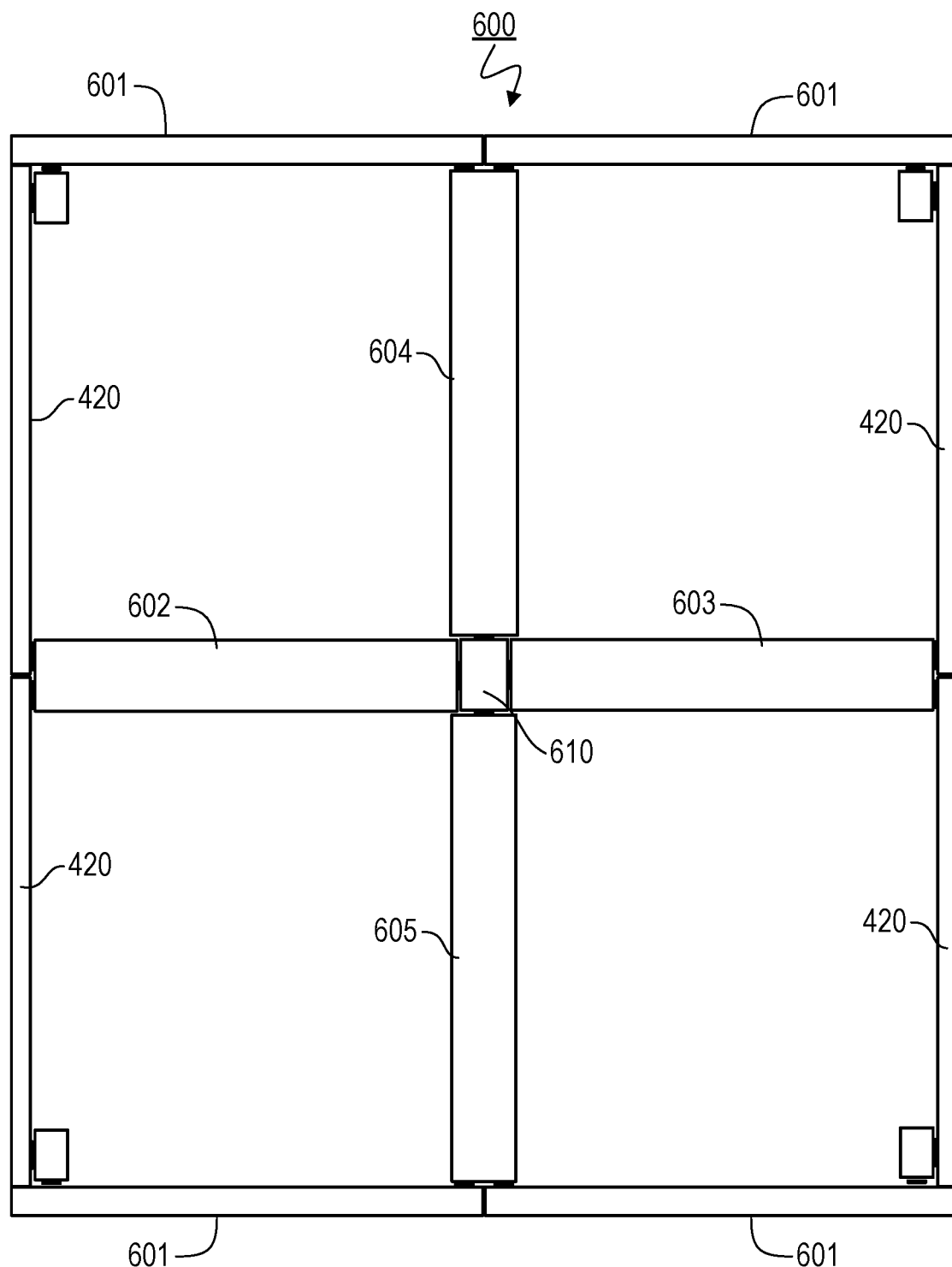
FIG. 28 is a top plan view of a completed foundation, other than top panels and ledges, according to an alternate variation.

For instance, FIG. 28 illustrates a larger foundation 600 (e.g., King or California King size), other than the top panels 480 or the ledges 422, in order to better illustrate the various components and how they are attached to each other. Although the foundation 600 is larger, it is still desirable to keep the individual components relatively small, e.g., not greater than 48 inches in length and, more preferably, not greater than 45 or 42 inches in length, so that all of the components can fit into a box that will not overhang a standard-sized pallet. As a result, rather than using a single panel, each of the head and foot of the foundation 600 is made up of two end panel assemblies 601. Preferably, each such end panel assembly 601 is identical to the end panel assembly 410 or 460 (discussed above), other than overall length (which may be different depending upon the desired width of the resulting foundation 600) and the fact that if brackets 114 are provided for attaching a headboard and/or a footboard, each such end panel assembly 601 includes just one (at its outer end). It is noted that in the current embodiment, it is assumed that end panel assembly 601 is symmetrical, so that the same component can be used at either position (albeit with adjacent and panel assemblies 601 rotated 180° relative to each other). If that is not the case, then two different components can be used.

Also, a wider foundation 600 often will require more longitudinal support than can be provided just by support beams 478 (discussed above). For this reason, in foundation 600 the lateral support is divided into two parts 602 and 603, and two similar supports 604 and 605 are included in order to provide longitudinal support. The outer end of each of these supports 602-605 preferably is identical to the outer ends of crossmember assembly 440, discussed above, e.g., including two parallel sliding assemblies 404 on its end surface for attaching two side or end panel assemblies end-to-end in the manner discussed above and including a female threaded opening in its bottom surface for attaching a leg 475 or other component (e.g., as discussed above). However, the inner ends of supports 602-605 can include just a single sliding mechanism (of either type) which attaches to a mating sliding mechanism on center hub 610, which has such a mating sliding mechanism on each of its four sides (and preferably also includes a female threaded opening in its bottom surface for attaching a leg 475 or other component, e.g., as discussed above). As a result of this configuration, rather than using a single long end panel assembly, two shorter end-to-end panels can be used at the head and foot of the foundation 600, in a similar manner to how the side panel subassemblies 420 are used in foundation 400, thereby keeping the overall length of each component beneath the maximums noted above. In alternate embodiments, e.g., where it is desirable to use crossmember assembly 440 within foundation 600 (and thereby avoid having to manufacture a different component), supports 602-605 are replaced by crossmember assembly 440, and a central hub with two parallel sliding mechanisms on each of its four surfaces instead is used. Other than as described in this paragraph, the other components of foundation 600 preferably are the same as the components of foundation 400 (discussed above).

Figure 29:
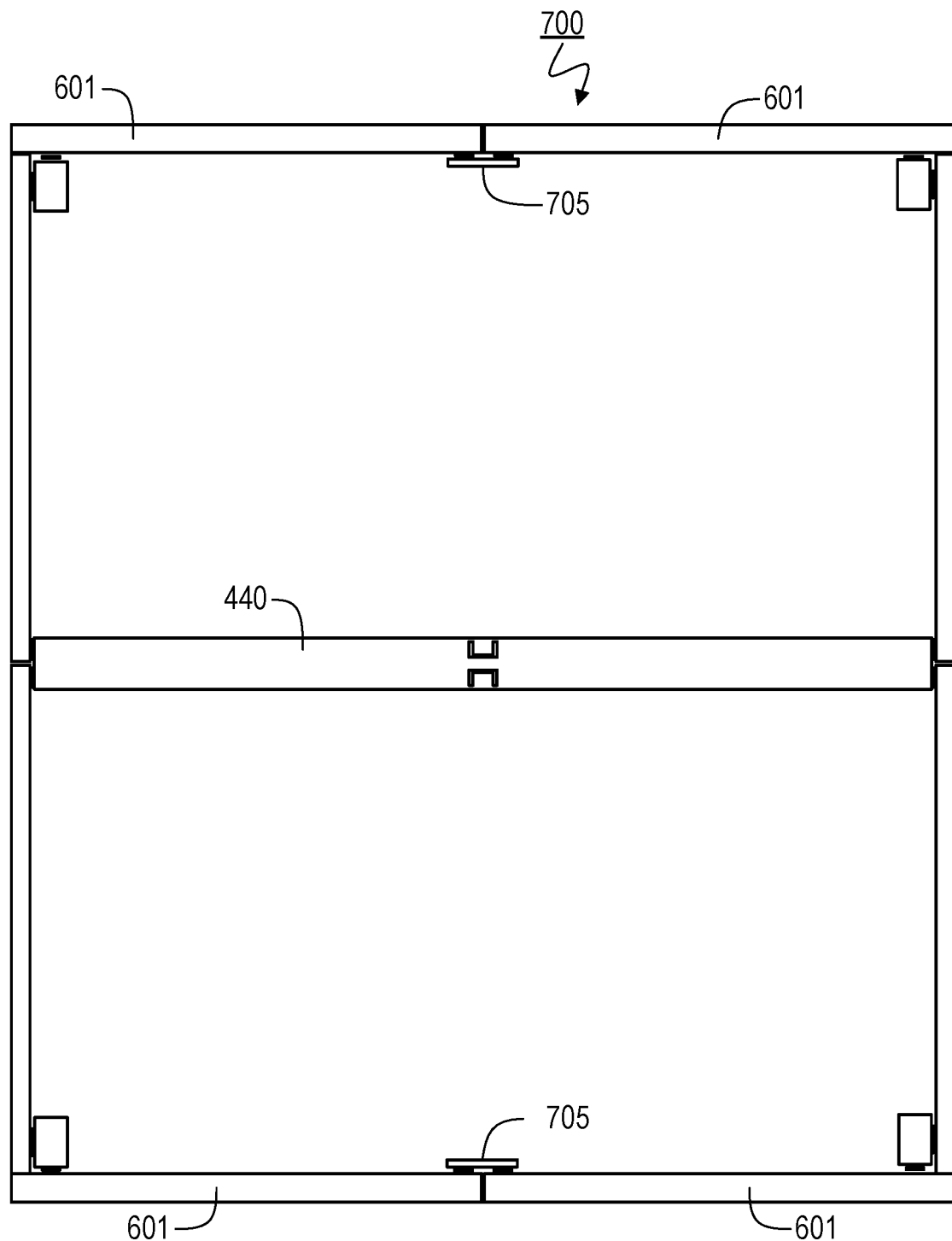
FIG. 29 is a top plan view of a completed foundation, other than top panels and ledges, according to still further variation.

Finally, FIG. 29 shows a foundation 700, which is similar to foundation 600 but can rely on longitudinal supports 478, rather than the stronger supports 604 and 605. Therefore, in this variation, foundation 700 includes two relatively narrow panels or plates 705, with each including two sliding mechanisms that engage with sliding mechanisms on adjacent end panel assemblies 601, thereby attaching such end panel assemblies 601 to each other in the same manner that supports 604 and 605 do in foundation 600. Alternatively, each of the components 705 can be made wider and can include a female threaded opening in its bottom surface to accommodate installation of a leg 475 or similar component (as discussed above). Also, because it is not necessary to include longitudinal supports 604 and 605 in this variation, a single crossmember assembly 440 can be used in this variation (although with a greater overall length than the crossmember assembly 440 used in foundation 400, discussed above). However, rather than using a single long crossmember assembly 440, crossmember assembly 440 instead can be comprised of two subassemblies that slide together, e.g., with each having two elongated protruding elements 402 at one end and two elongated sliding assemblies 404 (each defining a slot 406) at the other end, so that the two subassemblies can be simply slid together.

In the description above, headboard end panel assembly 410, side panel subassemblies 420, footboard end panel assembly 460 and corner pieces 470 generally are discussed as being separate components. However, it is noted that, unless clearly and expressly indicated to the contrary, an individual corner piece 470 might be considered to be part of a headboard end panel assembly 410, side panel subassembly 420 or footboard end panel assembly 460, when attached to it.

In the embodiment described above, the two side panel subassemblies 420 for each of the left and right side panel assembly slidably attach to each other indirectly (through their mutual attachment to crossmember assembly 440). However, the present invention includes other configurations for the side panel assemblies, preferably also including two separate subassemblies or segments they can be fixedly attached to each other, preferably end-to-end, when in use, and then can be arranged in a shorter configuration, e.g., for storage and/or transportation, when not in use. The ability to separate the two subassemblies as separate components, e.g., in accordance with the preceding embodiment, typically will allow the greatest flexibility in this regard. Although slidable attachments are used in the present embodiment, any other attachment mechanism instead may be used. Preferably, any such other mechanism also permits attachment and detachment quickly, easily and without the need for separate tools, small screws or similar hardware.

Figure 30:
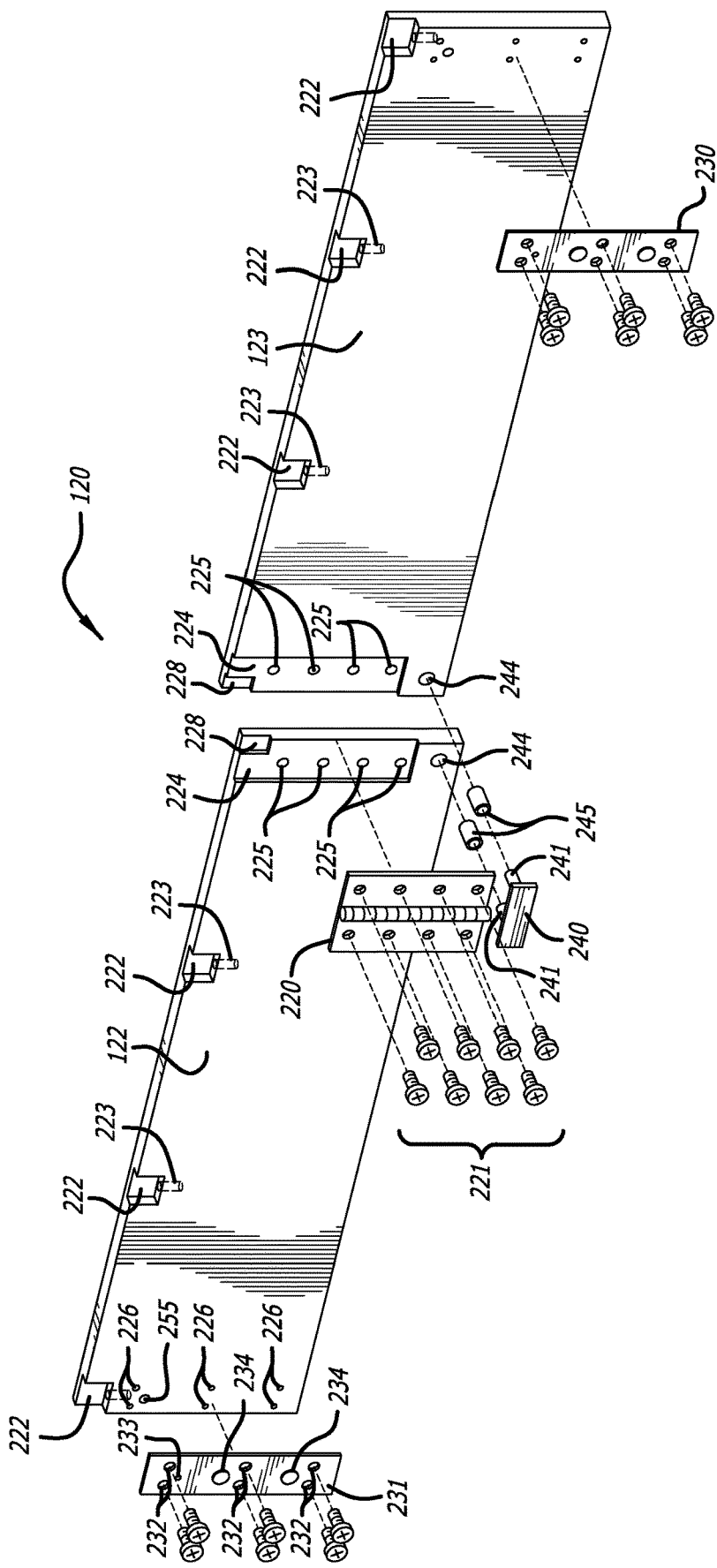
FIG. 30 is an exploded perspective view of a side rail assembly.
Figure 31:
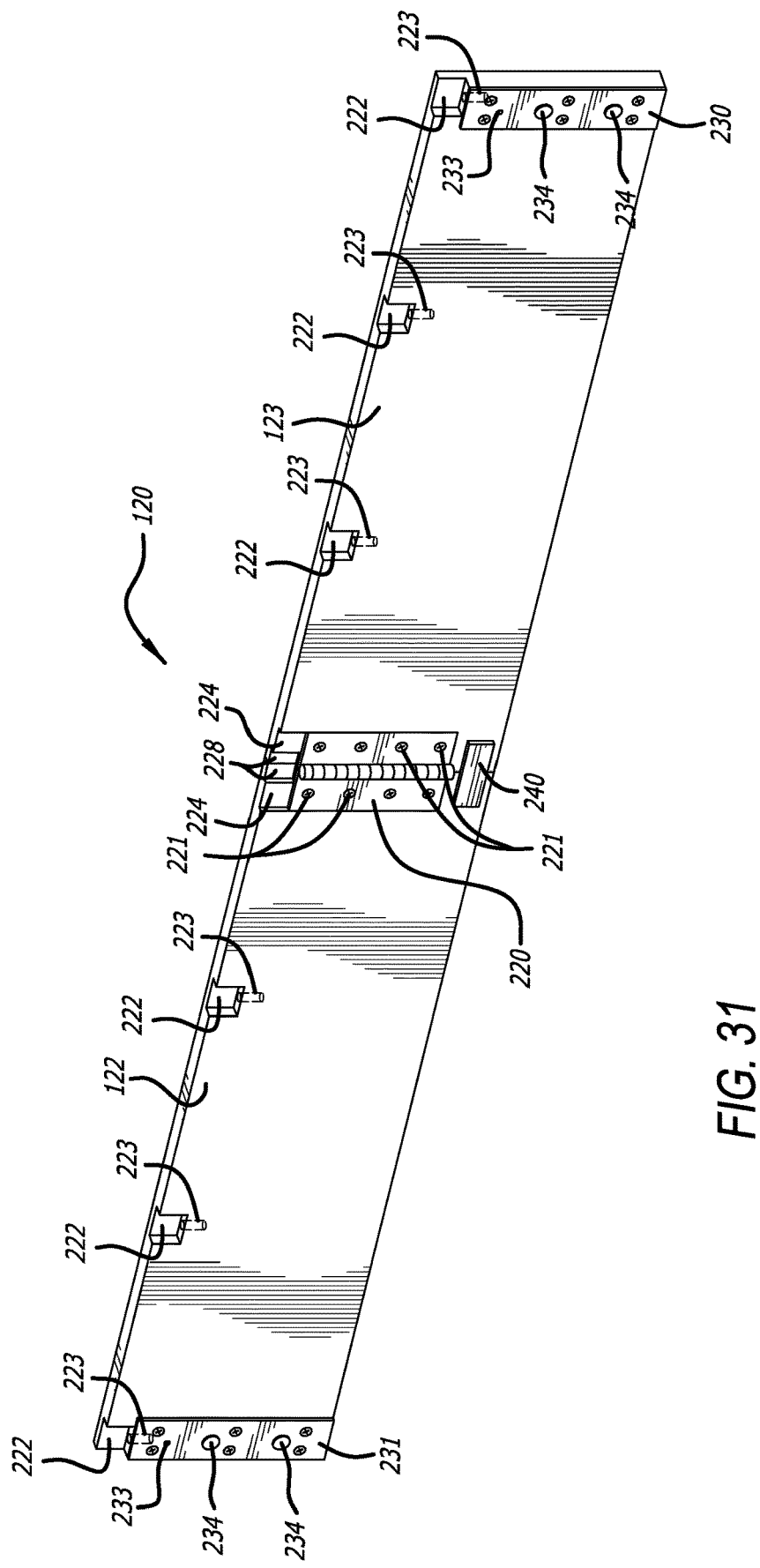
FIG. 31 is a perspective view of the side rail assembly.
Figure 32:
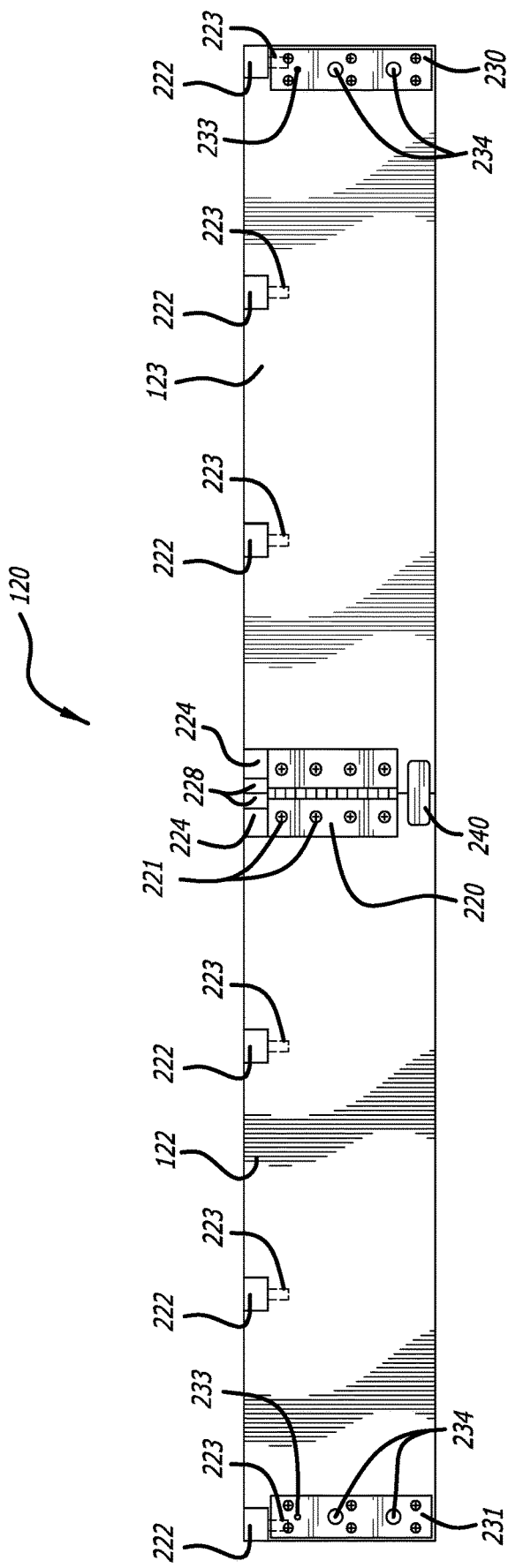
FIG. 32 is a top plan view of the side rail assembly.

Rather than using side panel assemblies 420, a side panel assembly 120 (which could be either the left or the right side panel assembly), as shown in FIGS. 30-32, is used in an alternate embodiment. In this embodiment, e.g., rather than completely separating into two distinct components, the two segments or subassemblies for each of the left and right side panel assembly are hingedly attached to each other.

More specifically, each side panel assembly 120 includes panels 122 and 123, which form the main structure of the side panel assembly 120 and which are attached to each other using a hinge 220 (preferably made of steel or another metal), with one plate of the hinge 220 attached to the inner surface of the panel 122 and the other plate of the hinge 220 attached to the inner surface of the panel 123, using screws 221. As a result of this configuration, the entire side rail assembly 120 can be folded in half, e.g., for times when the foundation of which it is a part is not in use. Each of the panels 122 and 123 preferably is made of wood (preferably at least ¾ inch thick and, more preferably, at least 1 inch thick) and optionally includes: i) a series of notches 222 (identical across the top edges of such panels, rectangularly shaped and uniformly spaced in the current embodiment) within its inner surface (preferably, extending only part of the way through the thickness of the panel), with a hole 223 (tubularly shaped in the current embodiment) extending downwardly from the bottom surface of each such notch 222, and with a half notch 228 in each of the panels 122 and 123 where they are hingedly attach together (thus, together forming a single notch); ii) an indentation 224 and four pre-drilled holes 225 at its inner end for seating and attaching one side of hinge 220; iii) one or more openings 244, e.g., each for accepting a bushing 245 (as described in greater detail in the priority applications) at its inner end; and iv) six pre-drilled holes 226 at its outer end for attaching a locator plate 230 (which, in turn, provides protruding elements 234 and an opening 255, the latter for accepting a retainer, as discussed in greater detail in the priority applications). As shown, the locator plate 230 includes: i) a backing plate 231 that has six holes 232 (corresponding to holes 226) through which screws may be inserted for attaching the locator plate 230 to the inner surface at the distal (or outer) end of the corresponding panel 122 or 123; ii) an opening 233; and iii) two protruding alignment elements 234 (preferably rivets or similar structures, each having an enlarged head portion at the distal end of a narrow portion, which in turn extends from the backing plate 231). When the foundation is set up, the protruding alignment elements 234 for each locator plate 230 preferably align with the matching larger portion of keyhole-shaped openings (or slots, e.g., elongated slots) in another component (e.g., a corner bracket) to which it is to be attached, and the opening 233 aligns with an opening in such other component and with the opening in a retainer (which, in turn, is inserted into the opening 255 in one of the side panels 122 or 123), e.g., as discussed in greater detail in the priority applications.

Because the side panel assembly 120 preferably is completely symmetrical, the same structure can be used for the left side panel assembly and for the right side panel assembly, thereby saving manufacturing costs. In use, each such side panel assembly 120 is rotated 180° relative to the other, so that their inner surfaces face each other.

In the embodiments discussed above, the main structural components (e.g., panels or beams) typically are described as preferably being made of wood. However, in each such instance where wood is mentioned, another material, such as plastic or a composite material, instead is used in an alternate embodiment of the present invention.

Also, each of the mattress foundations described herein often will be used as a structure by itself. However, the present invention also contemplates structures in which two or more such foundations are attached (preferably detachably attached) together to form a larger structure that functions as a larger mattress foundation. For instance, in certain embodiments, the left side panel assembly (i.e., the left side) of one foundation 400 is detachably attached to the right side panel assembly (i.e., the right side) of another foundation 400 to provide a single foundation that is twice as wide. Such two-piece structures preferably are used for Full, Queen, King and California King sizes. The detachable attachment mechanisms for attaching two (or more) such foundations into a larger foundation can include, e.g.: (1) mating high-density hook-and-loop materials (e.g., Velcro™); (2) any of the sliding mechanisms discussed herein; (3) one or more a locking elements, as described in the '333 application, but inserted into openings provided in the top edges of the adjacent side panel assemblies that are to be joined together and/or inserted into openings in the top surfaces of the ends of the headboard end panel assemblies 410 that are to be joined together and/or the top surfaces of the ends of the footboard end panel assemblies 460 that are to be joined together; (4) one or more rivets or similar components, each having an enlarged head, extending from one of the side panel assemblies and a mating keyhole opening provided in the other side panel assembly to be joined to it; and/or (5) any of a variety of other bolting, clamping, pinning or other mechanisms. However, as noted above, screws, bolts and similar hardware, particularly ones that require separate tools or that can be completely removed so as to be small pieces of loose hardware are avoided in the preferred embodiments of the present invention.

Figure 33:
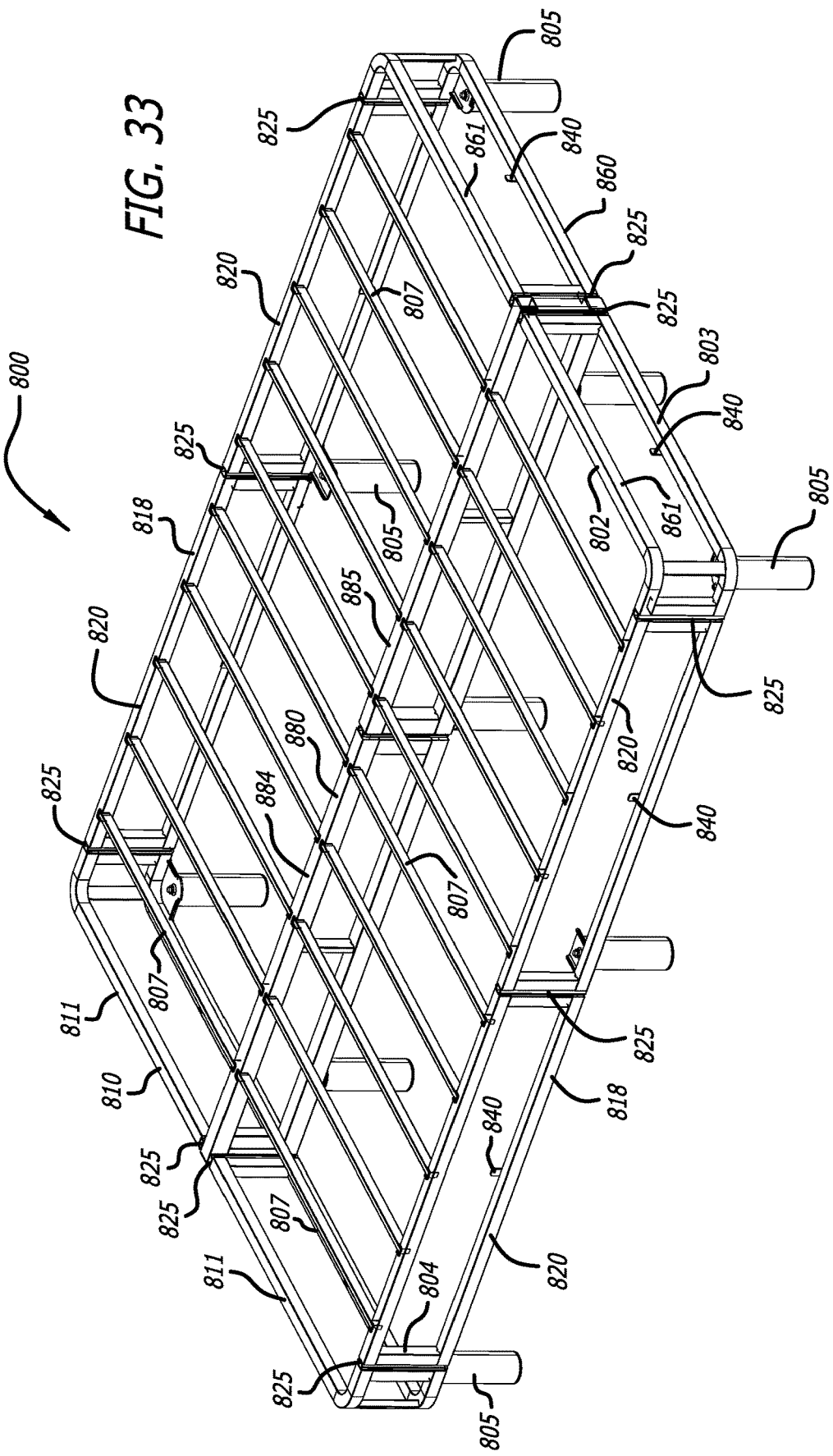
FIG. 33 is a perspective view of a foundation according to the present invention.
Figure 34:
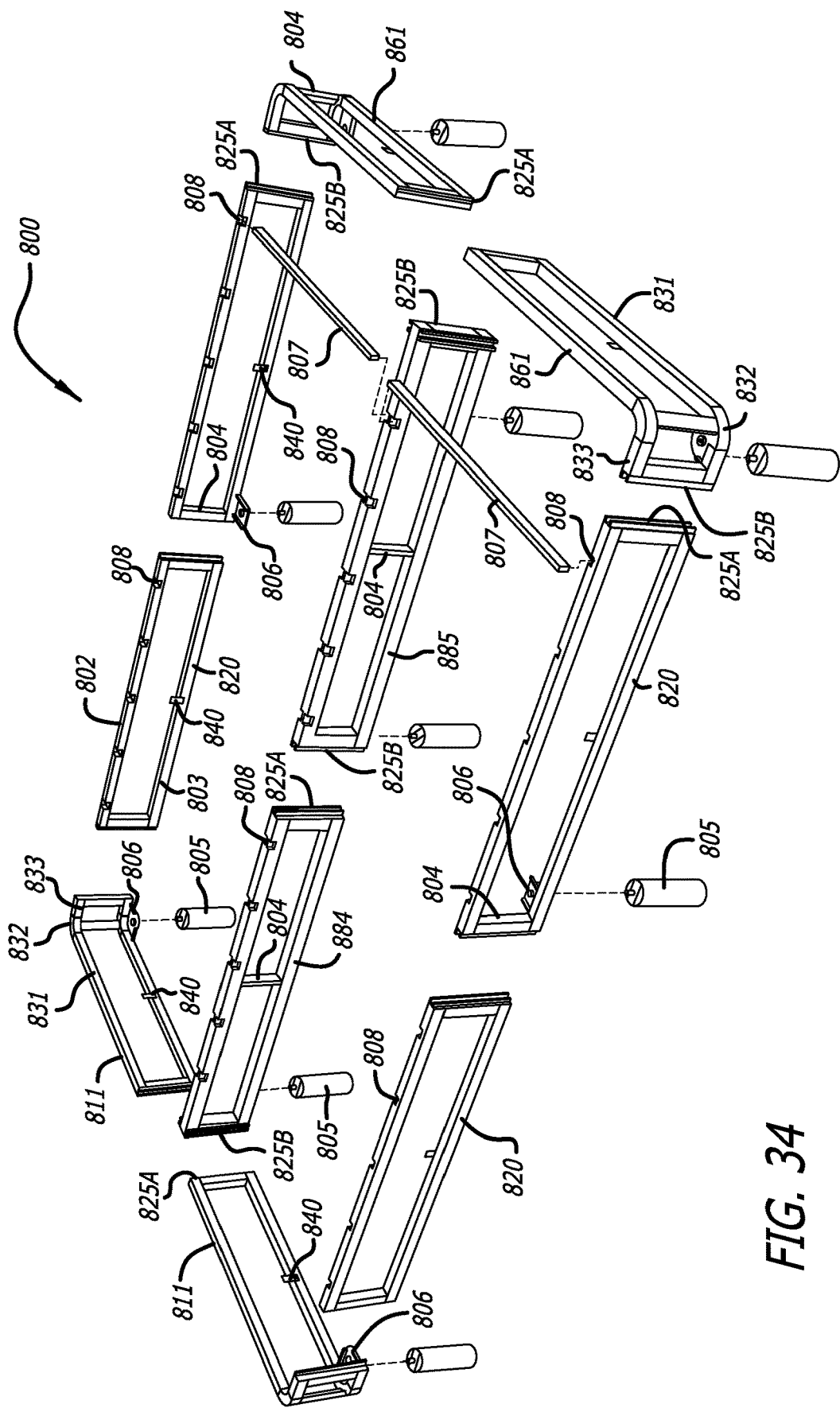
FIG. 34 is an exploded perspective view of the foundation shown in FIG. 33.

FIGS. 33 and 34 illustrate a mattress foundation 800 according to another embodiment of the present invention. Similar to the previous embodiments, foundation 800 includes a head end panel assembly 810, left and right side panel assemblies 818, and a foot end panel assembly 860. Also similar to at least one of the previous embodiments: (1) head end panel assembly 810 preferably is comprised of two head panel subassemblies 811 that are approximately equal in length and that slidably attach to each other (indirectly in the current embodiment); (2) each of the left and right side panel assemblies 818 preferably is comprised of two side panel subassemblies 820 that are approximately equal in length and that slidably attach to each other (directly in the current embodiment); (3) the foot end panel assembly 860 is comprised of two foot panel subassemblies 861 that are approximately equal in length and that slidably attach to each other (indirectly in the current embodiment); and (4) a longitudinal support assembly 880, comprised of two longitudinal supports 884 and 885 that are approximately equal in length and that slidably attach to each other (directly in the current embodiment), extends between the head end panel assembly 810 and the foot end panel assembly 860.

Some of the differences between the current embodiment and the previous embodiments are that, in mattress foundation 800: (1) each of the head panel subassemblies 811 and the foot panel subassemblies 861 includes a main section 831, a corner segment 832 (preferably smoothly curved, e.g., as shown in FIGS. 33 and 34, at least along its outer edge), extending from the distal end of the main section 831, and an end segment 833, extending from the distal end of the corner segment 832, with the end segments 832 being perpendicular, or at least substantially perpendicular, to the main section 831; (2) one or more (preferably each) of head end panel assembly 810, left and right side panel assemblies 818, foot end panel assembly 860 and longitudinal support assembly 880 has a frame structure, e.g., including an upper beam 802 and a lower beam 803, separated from each other by a gap of at least 2, 2.5, 3, 3.5, 4, 4.5, 5, 5.5 or 6 inches, with vertical supports 804 between them (e.g., at the ends of each separate component or subassembly and, in some cases in the middle of the component, particularly segments where additional reinforcement is desired and/or at corners or bends); (3) a set of half-width crossbars 807, preferably at least 5-8 on each side (10 in the current embodiment), provides a significant portion of the top surface of, as well as providing reinforcement of, the foundation 800; and (4) most or all of the main structural components (e.g. head end panel assembly 810, left and right side panel assemblies 818, foot end panel assembly 860 and longitudinal support assembly 880) are made primarily or entirely of metal (more preferably, steel).

In the current embodiment, the entire mattress foundation 800 is made almost entirely of steel. However, in alternate embodiments, any or all of the components (or portions of them) can be made of other materials, such as any of the materials noted elsewhere herein. The main considerations in this regard typically will involve trade-offs between minimizing cost, minimizing the weight of the overall mattress foundation 800, and providing sufficient strength. Accordingly, alternate embodiments can include, e.g.: use of other materials; increasing the number of vertical supports 804; and/or use of angular, triangular and/or other-shaped supports in place of, or in addition to, vertical supports 804.

Although not shown in the drawings, similar to the previous embodiments, the head end panel assembly 810 and/or the foot end panel assembly 860 can be provided with brackets (e.g., a pair of conventional brackets) for attaching a headboard or footboard, respectively. In any event, in the preferred embodiments, head end panel assembly 810 and foot end panel assembly 860 are identical to each other, and the left and right side panel assemblies 818 are identical to, or mirror images of, each other, e.g., in order to reduce manufacturing costs and/or to provide for easier assembly.

As shown in FIGS. 33 and 34, mattress foundation 800 includes a plurality of legs 805 (9 in the current embodiment, which is Queen-sized). In the current embodiment, some of the legs 805 attach to (preferably thin, flat) segments 806 that extend inwardly from some of the structural component(s) (more specifically in the current embodiment, the lower beam 803 of the foundation 800's peripheral components), such as the corner segments 832 and the left and right side panel assemblies 818. Additional legs 805 directly attach to other structural component(s) (in the current embodiment, the lower beam 803 of the longitudinal support assembly 880). However, in alternate embodiments, all the legs 805 attach directly to segments 806 or all the legs 805 attach directly to the structural components.

In any event, as in at least some of the previous embodiments, each such leg 805 preferably includes a threaded male member extending from its top surface, and the corresponding component or surface to which such leg 805 is to be attached includes a corresponding opening, so that such threaded male member can be simply inserted into the opening and then the entire leg 805 secured to such component or surface using a nut with matching female threads, particularly when attached to an inwardly extending segment 806, or the corresponding opening is itself internally threaded so that a separate nut is not required, particularly when the leg 805 is attached directly to the corresponding structural component (which typically is thicker than an inwardly extending segment 806 would be and, therefore, typically can fully enclose such a female-threaded component). However, in certain embodiments, a female-threaded component is permanently attached to the top surface of the inwardly extending segment 806, thereby again avoiding the need for separate hardware and, therefore, simplifying assembly.

As with the other components, the legs 805 are made of steel in the current embodiment. However, in alternate embodiments, some or all of legs 805 instead are made of another material (e.g., any of the materials noted herein, so as to better balance the trade-offs noted above). In the current embodiment, the legs 805 have a main body section (excluding the threaded male member) that is cylindrically shaped (but instead, e.g., could have any of the other shapes noted herein) and approximately 6-8 (more preferably, approximately 7) inches long. Also, in alternate embodiments, legs 805 are replaced with casters (e.g., wheels) or other structures for elevating the frame 800 above the floor.

In the current embodiment, crossbars 807 extend between the longitudinal support assembly 880 and the left and right side panel assemblies 818. For this purpose: (1) the top surface of longitudinal support assembly 880 has notches 808 on its left side, and corresponding notches (e.g., at the same longitudinal position) are provided on the top surface of the left side panel assembly 818; and (2) the top surface of longitudinal support assembly 880 also has notches 808 on its right side, and corresponding notches (e.g., at the same longitudinal position) are provided on the top surface of the right side panel assembly 818. Accordingly, each crossbar 807 can be installed by simply dropping or pressing it into a matching pair of notches 808, one in the longitudinal support assembly 880 and the other in either the left or right side panel assembly 818.

In the current embodiment, the notches 808 in the longitudinal support assembly 880 occur in pairs (e.g., at the same longitudinal position, but preferably separated by a barrier), so that the notches 808 in the left and right side panel assemblies 818 also can be thought of as occurring in pairs (e.g., at the same longitudinal position). However, in alternate embodiments the crossbars 807 (and corresponding notches 808) occur at different longitudinal positions when comparing the left side to the right side. In the current embodiment, each of the crossbars 807 and corresponding notches 808 has a rectangular cross-section, and the two match each other, so that the top surface of each crossbar 807 is flush with the top surface of the component into which the corresponding notch 808 has been formed. As a result, when installed, the top surfaces of the crossbars 807, together with the top surfaces of such components, form a flat surface upon which a mattress can be placed. Preferably, the longitudinally adjacent crossbars 807 are separated from each other by a gap of 5-10 inches (more preferably 6-9 or 7-8 inches), so as to provide adequate support for a mattress, while still minimizing the amount of material used (and, therefore, cost and weight as well). Also, in the current embodiment, the crossbars 807 primarily are made of steel or another metal. However, in alternate embodiments other cross-sections and/or materials (e.g., any of the other materials noted herein) instead, or in addition, are used for the crossbars 807 and notches 808.

The main structural components of mattress foundation 800 (e.g., head end panel assembly 810, left and right side panel assemblies 818, foot end panel assembly 860 and longitudinal support assembly 880), as well as the smaller structural components (e.g., head panel subassemblies 811, side panel subassemblies 820, foot panel subassemblies 861 and longitudinal support subassemblies 881) making up those main structural components simply slide together. For this purpose, any of a variety of different kinds of sliding mechanisms 825, each consisting of two slidably mating components 825A&B, may be used. For example, sliding mechanisms 825 can be or include any of the sliding mechanisms discussed herein (e.g., with one of the components 825A&B disposed on each of the two components to be slidably attached to each other). However, the currently preferred sliding mechanism 825 uses an elongated protruding element or tab 402 (e.g., any of elongated protruding elements 402A-C) and an elongated slot 406 (e.g., either of elongated slots 406A or 406B), again, with at least one (preferably both) having a horizontal cross-section that includes thin elongated flexible arms, attached at their proximal ends to a common surface, but otherwise extending away from such common surface and separated from each other. As in the previous embodiments: (1) both components 825A&B preferably are made of thin metal (more preferably steel), but any other (preferably strong) material (such as a strong plastic or composite) instead may be used in alternate embodiments; (2) at least one of the components 825A&B tapers in width along its length; and (3) the structure 404 defining the elongated slot 406 preferably includes a stop 407.

In the preferred embodiments, most, or at least some, of the main structural components of mattress frame 800 simply slide together end-to-end, with a sliding component 825A at the end of one and a sliding component 825B at the end of the other. However, in the case of a three-way or four-way junction (such as where the two head panel subassemblies 811 join with the longitudinal support assembly 880 or where the two foot panel subassemblies 861 join with the longitudinal support assembly 880), at least two of the structural components (such as the head panel subassemblies 811 or the foot panel subassemblies 861) preferably slidably attach to each other indirectly, via a third component of the junction (e.g., the longitudinal support assembly 880 in the present case). In any case, each complete sliding mechanism 825 comprises one each of the individual sliding components 825A&B, with the specific arrangement of such sliding components 825A&B preferably being determined based on other factors, such as ease of manufacturing or assembly, or a goal of minimizing the number of different components.

In the current embodiment, each of the head end panel assembly 810 and the foot end panel assembly 860 includes a pair of corner segments 832, each providing a 90° (or right angle) corner, preferably one such corner segment 832 disposed near each end of each of the head end panel assembly 810 and the foot end panel assembly 860. As shown, each such corner segment preferably provides a smooth curve or bend, at least along its outer edge (e.g., having an outer edge with a curvature radius of at least 1, 1.5 or 2 inches), rather than an abrupt or rectangular corner. Also, in the current embodiment, extending from the distal end of each corner segment 832 is a straight end segment 833, e.g., approximately 1-3 inches long and oriented perpendicularly to the corresponding main section 831. Such a structure can provide a good combination of strength and safety while also ensuring that the individual components remain small enough so that, when disassembled, the entire mattress foundation 800 is capable of fitting into a small box. In the preferred embodiments, each of the corner segments 832 is permanently part of (e.g., welded to or integrally formed with) one of the main structural components of the mattress foundation 800, in order to promote structural integrity and/or to reduce the number of components that need to be attached during the assembly process. However, each of the corner segments 832 is not necessarily part of, or attached to the head end panel assembly 810 or the foot end panel assembly 860 (e.g., in alternate embodiments, instead being part of, or attached to, one of the side panel assemblies 818 or one of the side panel subassemblies 820).

The dimensions of the mattress foundation 800 (and its individual components) preferably are chosen so that the assembled foundation 800 matches the size of the mattress (e.g., twin, twin XL, full, full XL, Queen, King or California King) that it is intended to support. For example, the present foundation 800 for supporting a Queen size mattress, when assembled, preferably is 60 inches wide (e.g., the width of the head end panel assembly 810 and the foot end panel assembly 860) and 80 inches long (the distance from the outer edge of the head end panel assembly 810 to the outer edge of the foot end panel assembly 860). For some sizes, particularly ones that are fairly narrow, such as twin or twin XL, the center longitudinal support assembly 880 can be omitted, e.g., with the head panel subassemblies 811 directly slidably attaching to each other, the foot panel subassemblies 861 also directly slidably attaching to each other, and each crossbar 807 extending between aligned notches 808 in the left and right side panel assemblies 818.

Assembly of mattress foundation 800 preferably simply involves first optionally attaching the legs 805, then sliding the main structural components together, and finally inserting the crossbars 807 into the corresponding notches 808. As a result, foundation 800 can be assembled very quickly and often without using any tools or small separate hardware components. Following assembly, a fitted fabric covering (not shown) preferably is installed over the foundation 800. For the purpose of securing such a fabric covering, anchors 840 preferably are provided on the head end panel assembly 810, the foot end panel assembly 860, and the left and right side panel assemblies 818.

In the current embodiment, anchors 840 are implemented as upwardly extending steel tabs, each integrally formed with the structural component from which it extends, and the fabric covering has a plurality of corresponding separately extending loops (preferably also made of fabric), which extend underneath the foundation 800 and then loop over the anchors 840. However, in alternate embodiments each anchor 840 instead, or in addition, includes: a substantially rigid hook or ring for the fabric covering to attach to, a magnet (with the attaching portion of the fabric covering including a ferrous element or an opposite-polarity magnet), and/or a high-density hook or loop (e.g., Velcro™) element (with the attaching portion of the fabric covering including a complementary high-density hook or loop element). Also, rather than using separately extending loops, in alternate embodiments the fabric covering extends further along its entire inner edge, and that inner edge is provided, e.g., with slits through which the anchors 840 (e.g., tabs) extend and/or any of the other attachment mechanisms noted above.

Additional Considerations.

In each of the foregoing embodiments, the two side panel assemblies include two (or more) subassemblies that are attached together (or otherwise arranged) end-to-end when in use, but then can be arranged substantially parallel to each other when not in use. In one embodiment discussed above, this is accomplished by folding each side panel assembly, e.g., when one desires to store or transport the foundation, or unfolding each side panel assembly, e.g., when one desires to set up and then use the foundation. In other embodiments discussed above, the side panel subassemblies are capable of completely detaching from each other, so they can be placed into any desired configuration (e.g., substantially parallel to each other) when the foundation is not set up for use (e.g., when one desires to store or transport it). Either such structure can make it much easier to transport and/or store a foundation when not in use. Moreover, the structures described herein often can greatly facilitate the setting up of a foundation for use, as well as the subsequent breaking down of the foundation, e.g., for storage and/or transportation.

As used herein (which term, without further qualification, includes materials incorporated by reference herein), the term "attached", or any other form of the word, without further modification, is intended to mean directly attached, attached through one or more other intermediate elements or components, or integrally formed together. In the drawings and/or the discussion herein, where two individual components or elements are shown and/or discussed as being directly attached to each other, such attachments should be understood as being merely exemplary, and in alternate embodiments the attachment instead may include additional components or elements between such two components. Similarly, method steps discussed and/or claimed herein are not intended to be exclusive; rather, intermediate steps may be performed between any two steps expressly discussed or claimed herein.

Unless otherwise clearly stated herein, all relative directions (e.g., left, right, top, bottom, above, below) mentioned herein in relation to an article are from the perspective of the article itself and, therefore, are consistent across different views.

In the event of any conflict or inconsistency between the disclosure explicitly set forth herein or in the accompanying drawings, on the one hand, and any materials incorporated by reference herein, on the other, the present express disclosure shall take precedence. In the event of any conflict or inconsistency between the disclosures of any applications or patents incorporated by reference herein, the disclosure most recently added or changed shall take precedence.

Unless clearly indicated to the contrary, words such as "optimal", "optimize", "maximize", "minimize", "best", as well as similar words and other words and suffixes denoting comparison, in the discussion herein are not used in their absolute sense, but instead, such terms ordinarily are intended to be understood in light of any other potential constraints, such as user-specified constraints and objectives, as well as cost and processing or manufacturing constraints.

In the discussion herein, certain methods are explained by breaking them down into steps listed in a particular order. However, it should be noted that in each such case, except to the extent clearly indicated to the contrary or mandated by practical considerations (such as where the results from one step are necessary to perform another), the indicated order is not critical but, instead, that the described steps can be reordered and/or two or more of such steps can be performed concurrently.

References herein to a "criterion", "multiple criteria", "condition", "conditions" or similar words which are intended to trigger, limit, modify or otherwise affect processing steps, other actions, the subjects of processing steps or actions, or any other activity, are intended to mean "one or more", irrespective of whether the singular or the plural form has been used. For instance, any criterion or condition can include any combination (e.g., Boolean combination) of actions, events and/or occurrences (i.e., a multi-part criterion or condition).

In the discussions herein, the words "include", "includes", "including", and all other forms of the word should not be understood as limiting, but rather any specific items following such words should be understood as being merely exemplary.

Several different embodiments of the present invention are described herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof as limited solely by the claims appended hereto.

What is claimed is:

1. A mattress foundation, comprising:
   (a) a head end panel assembly;
   (b) a foot end panel assembly;
   (c) a left side panel assembly: (i) extending between, and attached to, both the head end panel assembly and the foot end panel assembly, and (ii) having a plurality of notches along its length;
   (d) a right side panel assembly: (i) extending between, and attached to, both the head end panel assembly and the foot end panel assembly, and (ii) having a plurality of notches along its length;
   (e) a longitudinal support assembly: (i) disposed between the left side panel assembly and the right side panel assembly, (ii) extending between, and attached to, both the head end panel assembly and the foot end panel assembly, and (iii) having a plurality of notches along its length;
   (f) a first set of crossbars, each having a first end disposed within one of the notches of the left side panel assembly and a second end disposed within one of the notches of the longitudinal support assembly; and
   (g) a second set of crossbars, each having a first end disposed within one of the notches of the right side panel assembly and a second end disposed within one of the notches of the longitudinal support assembly,
   wherein the longitudinal support assembly has a top surface into which the notches of the longitudinal support assembly have been formed, and
   wherein the notches of the longitudinal support assembly include left-side notches and right-side notches, and
   wherein the left-side notches are separated from the right-side notches by a barrier.

2. A mattress foundation according to claim 1, wherein adjacent ones of the crossbars are separated from each other by a gap that is within a range of 5-10 inches.

3. A mattress foundation according to claim 1, wherein each of the first set of crossbars and the second set of crossbars includes at least 6 crossbars.

4. A mattress foundation according to claim 1, wherein the longitudinal support assembly is comprised of two longitudinal supports that are slidably attached to each other.

5. A mattress foundation according to claim 4, wherein each of the head end panel assembly, foot end panel assembly, left side panel assembly and right side panel assembly is comprised of two subassemblies that are slidably attached to each other.

6. A mattress foundation according to claim 5,
   wherein said two longitudinal supports are approximately equal in length, and
   wherein for each of the head end panel assembly, foot end panel assembly, left side panel assembly and right side panel assembly, the two subassemblies are approximately equal in length.

7. A mattress foundation according to claim 1, wherein a top surface of each said crossbar is flush with a top surface of a component having the notch into which said crossbar has been inserted.

8. A mattress foundation according to claim 1, wherein the head end panel assembly, the left and right side panel assemblies, the foot end panel assembly and the longitudinal support assembly are made primarily of steel.

9. A mattress foundation according to claim 1, wherein the crossbars primarily are made of steel.

10. A mattress foundation according to claim 1, wherein the longitudinal support assembly is slidably attached to each of the head end panel assembly and the foot end panel assembly.

11. A mattress foundation according to claim 1, wherein the longitudinal support assembly has a frame structure, including an upper beam and a lower beam, separated from each other by a gap of at least 4 inches, with supports between the upper beam and the lower beam.

12. A mattress foundation according to claim 11, wherein at least one of said supports is vertical.

13. A mattress foundation according to claim 1, further comprising at least one of legs or casters, attached to the longitudinal support assembly, for elevating said mattress foundation.

14. A mattress foundation according to claim 1, wherein each of the crossbars and the notches has a matching rectangular cross-section.

15. A mattress foundation according to claim 1, wherein at least two of the notches in the top surface of the longitudinal support assembly occur in a pair, with each said pair including one of the left-side notches and one of the right-side notches at a same longitudinal position.

* * * * *